（12）United States Patent
Graham et al.

(10) Patent No.: US 10,318,491 B1
(45) Date of Patent: Jun. 11, 2019

(54) OBJECT METADATA QUERY WITH DISTRIBUTED PROCESSING SYSTEMS

(71) Applicant: EMC Corporation, Hopkinton, MA (US)

(72) Inventors: Stephen G. Graham, Chapel Hill, NC (US); Eron D. Wright, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 14/674,324

(22) Filed: Mar. 31, 2015

(51) Int. Cl.
*G06F 17/30* (2006.01)
*G06F 16/182* (2019.01)
*G06F 16/951* (2019.01)

(52) U.S. Cl.
CPC .......... *G06F 16/182* (2019.01); *G06F 16/951* (2019.01)

(58) Field of Classification Search
CPC ............... G06F 17/30194; G06F 17/30864
USPC ....................................................... 707/718
See application file for complete search history.

(56) References Cited

U.S. PATENT DOCUMENTS

| 8,375,047 | B2* | 2/2013 | Narayanan ............ G06F 9/505 707/764 |
| 8,484,259 | B1 | 7/2013 | Makkar et al. |
| 8,812,450 | B1 | 8/2014 | Kesavan et al. |
| 9,026,499 | B1 | 5/2015 | Rajimwale et al. |
| 9,052,942 | B1 | 6/2015 | Barber et al. |
| 9,141,658 | B1 | 9/2015 | Nair et al. |
| 9,396,290 | B2 | 7/2016 | Ogasawara et al. |
| 9,454,573 | B1 | 9/2016 | Welton et al. |
| 9,558,194 | B1 | 1/2017 | Srivastav et al. |
| 2003/0172059 | A1* | 9/2003 | Andrei ............ G06F 16/24537 |
| 2004/0098371 | A1* | 5/2004 | Bayliss ................ G06F 11/203 |
| 2005/0055326 | A1 | 3/2005 | Thusoo et al. |
| 2005/0188349 | A1 | 8/2005 | Bent et al. |
| 2006/0277170 | A1 | 12/2006 | Watry et al. |
| 2008/0021921 | A1* | 1/2008 | Horn ...................... G06F 16/22 |
| 2008/0115083 | A1 | 5/2008 | Finkelstein et al. |
| 2009/0187573 | A1* | 7/2009 | Johnston .................. G06F 8/10 |
| 2010/0106672 | A1* | 4/2010 | Robson ................ G06F 16/907 706/50 |
| 2011/0072006 | A1* | 3/2011 | Yu ........................ G06F 16/2471 707/718 |
| 2011/0145210 | A1 | 6/2011 | Rathinam et al. |

(Continued)

OTHER PUBLICATIONS

Response to U.S. Non-Final Office Action dated Nov. 30, 2016 for U.S. Appl. No. 14/501,904; Response filed on Feb. 28, 2017; 8 Pages.

(Continued)

*Primary Examiner* — Pierre M Vital
*Assistant Examiner* — Nargis Sultana
(74) *Attorney, Agent, or Firm* — Daly, Crowley, Mofford & Durkee, LLP

(57) ABSTRACT

A distributed object store can expose object metadata, in addition to object data, to distributed processing systems, such as Hadoop and Apache Spark. The distributed object store may acts as a Hadoop Compatible File System (HCFS), exposing object metadata as a collection of records that can be efficiently processed by MapReduce (MR) and other distributed processing frameworks. A distributed processing job can specify a metadata query to narrow the set of objects returned. Related methods are also described.

20 Claims, 11 Drawing Sheets

(56) References Cited

U.S. PATENT DOCUMENTS

| | | | |
|---|---|---|---|
| 2011/0153594 A1* | 6/2011 | Hagenbuch | G06F 11/366 707/718 |
| 2011/0153606 A1* | 6/2011 | Kim | G06F 16/1827 707/737 |
| 2011/0258225 A1 | 10/2011 | Taylor et al. | |
| 2011/0302583 A1* | 12/2011 | Abadi | G06F 16/2471 718/102 |
| 2012/0016901 A1 | 1/2012 | Agarwal et al. | |
| 2012/0150836 A1* | 6/2012 | He | G06F 16/951 707/708 |
| 2012/0166487 A1 | 6/2012 | Stougie et al. | |
| 2012/0198042 A1 | 8/2012 | Dunbar et al. | |
| 2012/0210342 A1 | 8/2012 | Gonzalez et al. | |
| 2012/0221558 A1* | 8/2012 | Byrne | G06F 17/30864 707/723 |
| 2012/0221571 A1 | 8/2012 | Orman | |
| 2012/0254174 A1 | 10/2012 | Mitra et al. | |
| 2013/0007062 A1 | 1/2013 | Dutta et al. | |
| 2013/0041872 A1* | 2/2013 | Aizman | G06F 16/182 707/690 |
| 2013/0042060 A1* | 2/2013 | Marukame | G06F 12/0246 711/108 |
| 2013/0054928 A1 | 2/2013 | Im | |
| 2013/0124466 A1 | 5/2013 | Naidu et al. | |
| 2013/0124467 A1* | 5/2013 | Naidu | G06F 8/453 707/610 |
| 2013/0151884 A1 | 6/2013 | Hsu et al. | |
| 2013/0297624 A1 | 11/2013 | Raghunathan et al. | |
| 2013/0326189 A1 | 12/2013 | Cilibrasi et al. | |
| 2014/0032595 A1* | 1/2014 | Makkar | G06F 16/25 707/770 |
| 2014/0040286 A1* | 2/2014 | Bane | G06F 7/24 707/754 |
| 2014/0052711 A1* | 2/2014 | Bamba | G06F 16/29 707/718 |
| 2014/0081978 A1 | 3/2014 | Fuchs et al. | |
| 2014/0156642 A1* | 6/2014 | Johnson | G06F 16/24573 707/722 |
| 2014/0201244 A1 | 7/2014 | Zhou | |
| 2014/0215574 A1 | 7/2014 | Erb et al. | |
| 2014/0229479 A1 | 8/2014 | Sharafi et al. | |
| 2014/0229628 A1 | 8/2014 | Mandal | |
| 2014/0280032 A1* | 9/2014 | Kornacker | G06F 16/24544 707/718 |
| 2014/0282615 A1 | 9/2014 | Cavage et al. | |
| 2014/0330802 A1 | 11/2014 | Preslan et al. | |
| 2014/0372384 A1 | 12/2014 | Long et al. | |
| 2015/0067004 A1 | 3/2015 | Shvachko et al. | |
| 2015/0095308 A1* | 4/2015 | Kornacker | G06F 16/258 707/718 |
| 2015/0095379 A1* | 4/2015 | Dickie | G06F 16/164 707/803 |
| 2015/0113010 A1 | 4/2015 | Muthyala et al. | |
| 2015/0169602 A1* | 6/2015 | Shankar | G06F 16/182 707/825 |
| 2015/0278244 A1 | 10/2015 | Shvachko et al. | |
| 2015/0293984 A1 | 10/2015 | Zolotusky, Jr. et al. | |
| 2015/0312356 A1 | 10/2015 | Roth et al. | |
| 2016/0098662 A1 | 4/2016 | Voss et al. | |
| 2016/0140176 A1* | 5/2016 | Chamberlin | G06F 16/24542 707/718 |

OTHER PUBLICATIONS

Response to U.S. Non-Final Office Action dated Nov. 30, 2016 for U.S. Appl. No. 14/501,891; Response filed on Feb. 28, 2017; 8 Pages.

U.S. Office Action dated Nov. 30, 2016 corresponding to U.S. Appl. No. 14/501,891; 12 Pages.

U.S. Office Action dated Nov. 30, 2016 corresponding to U.S. Appl. No. 14/501,904; 15 Pages.

U.S. Non-Final Office Action dated Jun. 2, 2017 for U.S. Appl. No. 14/674,314; 29 Pages.

Response to U.S. Final Office Action dated May 31, 2017 for U.S. Appl. No. 14/501,904; Response filed on Jun. 13, 2017; 7 Pages.

U.S. Final Office Action dated May 31, 2017 for U.S. Appl. No. 14/501,904; 7 Pages.

U.S. Notice of Allowance dated May 24, 2017 corresponding to U.S. Appl. No. 14/501,891; 7 Pages.

Notice of Allowance dated Jun. 26, 2017 for U.S. Appl. No. 14/501,904; 7 Pages.

Response to Office Action dated Jun. 2, 2017 from U.S. Appl. No. 14/674,314, filed Aug. 31, 2017; 13 Pages.

U.S. Final Office Action dated Dec. 15, 2017 corresponding to U.S. Appl. No. 14/674,314; 31 Pages.

Response to U.S. Final Action dated Dec. 15, 2017 for U.S. Appl. No. 14/674,314; Response and RCE filed May 2, 2018; 11 Pages.

Hadoop Wiki, "Overview of Sequence File;" Downloaded on Feb. 16, 2015; 3 Pages; https://wiki.apache.org/hadoop/SequenceFile.

Hadoop Wiki, "HDFS Architecture Guide;" Downloaded on Jan. 26, 2015; 8 Pages; http://hadoop.apache.org/docs/r1.0.4/hdfs_design.html.

EMC Corporation, "What is ViPR HDFS?;" Downloaded Jan. 26, 2015; 6 Pages; http://www.emc.com/techpubs/vipr/HDFS_overview-1.htm.

EMC Corporation; "ViPR 2.1—Use the ViPR Object Services;" Downloaded Oct. 1, 2014; 10 Pages; http://www.emc.com/techpubs/vipr/ds_use_object_services-2.htm.

EMC Corporation; "ViPR 2.1—ViPR S3 Object Service API Support;" Downloaded Oct. 1, 2014; 8 Pages; http://www.emc.com/techpubs/vipr/ds_s3_supported_features-t.htm.

EMC Corporation; "ViPR EMC Atmos Object Service API Support;" Downloaded Oct. 1, 2014; 7 Pages; http://www.emc.com/techpubs/vipr/ds_atmos_supported_features-1.htm.

EMC Corporation; "ViPR 2.1—ViPR OpenStack Swift Object Service API Support;" Downloaded Oct. 1, 2014; 5 Pages; http://www.emc.com/techpubs/vipr/ds_swift_supported_features-2.htm.

EMC Corporation; "ViPR 2.1—Use S3 Applications with ViPR Object Storage;" Downloaded Oct. 1, 2014; 7 Pages; http://www.emc.com/techpubs/vipr/ds_use_s3_apps_with_vipr-2.htm.

EMC Corporation; "ViPR 2.1—Create Buckets to Support ViPR Data Services;" Downloaded Oct. 1, 2014; 11 Pages; http://www.emc.com/techpubs/vipr/ds_create_bucket-2.htm.

EMC Corporation; "Unleash the Value of Data with EMC ViPR Services;" Apr. 2014; 11 Pages.

Graham et al.; "Object Metadata Query with Secondary Indexes;" U.S. Appl. No. 14/501,891, filed Sep. 30, 2014; 37 Pages.

Graham et al.; "Object Metadata Query;" U.S. Appl. No. 14/501,904, filed Sep. 30, 2014; 33 Pages.

Graham et al., "Exposing Object Metadata to Distributed Processing Systems;" U.S. Appl. No. 14/674,314, filed Mar. 31, 2015; 44 Pages.

* cited by examiner

OBJECT METADATA QUERY WITH DISTRIBUTED PROCESSING SYSTEMS

BACKGROUND

Currently available object stores include Amazon S3, Red Hat Ceph, Open Stack Swift, EMC's Atmos, and EMC's ViPR Object Data Service. Such systems may provide scale-out mechanisms for users to store and retrieve object data and metadata. These systems typically provide REST-based application programming interfaces (APIs) to insert, update, delete, and retrieve objects. For example, in the field of medical science, an object store may be used to store Digital Imaging and Communications in Medicine (DICOM) information, which contains metadata as well as the actual image data. Such metadata may include a patient's id, gender, age, etc.

In general, these systems do not provide query capabilities, making it difficult to build applications that query and retrieve objects therefrom. The current approach to solving this use case with object systems involves an application retrieving a superset of the desired objects and discarding those objects that do not meet the search criteria. This approach is resource intensive and inefficient for the object system's servers, the network, and the application.

Distributed processing systems allow for large-scale distributed processing. For example, Hadoop and Apache Spark are open-source distributed computing frameworks that enable distributed processing using commodity computing device. It is known to expose object data to distributed processing systems.

SUMMARY

Described herein are systems and techniques for exposing not only object data, but also object metadata, to distributed processing systems such as Hadoop. Hadoop MapReduce (MR) jobs can select a subset of object metadata in a bucket by posing queries to the object system in a high-level, declarative language. A metadata query is evaluated against stored object metadata, and only objects satisfying the query's predicates are returned. Secondary indexes, which may be stored within a distributed key-value store, can be defined by users considering the most common object access patterns. A distributed object store may acts as a Hadoop Compatible File System (HCFS), exposing metadata information as a collection of records that can be efficiently processed by MapReduce (MR) and other distributed processing frameworks. Various metadata records formats are supported.

For example, using concepts, techniques, and systems described herein, massive collections of DICOM image data and metadata can be processed and analyzed in a distributed, scalable manner.

According to one aspect of the disclosure, a method comprises: receiving a data request for object metadata from a distributed processing system, the data request associated with a bucket within a distributed object store, the data request comprising an object metadata query; identifying object within the bucket that satisfy the object metadata query; for each identified object, determining a location of corresponding object metadata stored within the distributed object store; for each identified object, retrieving the corresponding object metadata using the determined location; for each identified object, generating a metadata record from the corresponding object metadata; combining the metadata records from the identified objects into a metadata collection having a format compatible with the distributed processing system; and returning the metadata collection to the distributed processing system. In some embodiments, the data request further identifies a partition, wherein identifying one or more objects as objects associated with the bucket comprises identifying one or more objects as objects associated with the bucket and the partition.

In certain embodiments, receiving the data request for object metadata from a distributed processing system comprises receiving a data request from a Hadoop cluster. The data request for object metadata comprises receiving an Hadoop Distributed File System (HDFS) DataNode request. The method may further comprise receiving a Hadoop Distributed File System (HDFS) NameNode request from the distributed processing system, the HDFS NameNode request identifying a bucket within the distributed object store. Generating the metadata record from the corresponding object metadata may comprise generating a record in Apache Avro format, Apache Thrift format, Apache Parquet format, Simple Key/Value format, JSON format, Hadoop SequenceFile format, or Google Protocol Buffer format.

In some embodiments, receiving the data request for object metadata from a distributed processing system comprises receiving a data request from an Apache Spark cluster. Combining the metadata records into the metadata collection may comprise forming a Resilient Distributed Dataset (RDD).

In various embodiments, determining the location of corresponding object metadata stored within the distributed object store comprises using a distributed key/value store. Identifying the one or more objects as objects associated with the bucket may comprise issuing a PREFIX-GET command to a distributed key/value store, the PREFIX-GET command identifying a tenant and the bucket.

In particular embodiments, the object metadata query includes at least one predicate involving an object metadata key. Identifying object within the bucket that satisfy the object metadata query may comprise: parsing the object metadata query into a query parse tree; generating candidate query plans, each of the candidate query plans being semantically equivalent to the object metadata query; selecting one of candidate query plans; and identifying object that satisfy the query predicate by retrieving object ids from a secondary index using a bucket id associated with the bucket and the object metadata key involved in the query predicate. Selecting one of candidate query plans may comprise: evaluating the candidate query plans based upon a cost model; and selecting one of candidate query plans based upon the cost model evaluation. Generating candidate query plans may include: generating at least one logical query plans according to the received query; and generating a plurality of physical query plans according to the logical query plan, wherein the selected query plan corresponds to one of the plurality of physical query plans.

In some embodiments, generating a plurality of physical query plans may comprises generating a tree representation, wherein nodes of the tree representation correspond to operations, the method further comprising traversing the nodes of the tree representation and executing the corresponding operations. Retrieving object ids from a secondary index may comprise retrieving rows from a distributed key-value store using the bucket id associated with the query and the object metadata keys involved in the query predicate. Evaluating the candidate query plans based upon a cost model may comprise utilizing statistical information about the secondary index computed from the distributed key-value store.

According to another aspect of the disclosure, a system comprises: a distributed key/value store; a plurality of storage devices to store object data and object metadata; and a plurality of data service nodes, each of the data service nodes coupled to the distributed key/value store and corresponding ones of the storage devices. A first one of the plurality of data service nodes comprises: an object storage engine to determine the location of object metadata stored within the plurality of storage devices using the distributed key/value store; a storage controller to retrieve the object metadata from the plurality of storage devices; a metadata formatting module to generate metadata records from object metadata and to combine metadata records into a metadata collection having a format compatible with a distributed processing system; and an interface to receive a data request for object metadata from the distributed processing system, the data request associated with a bucket comprising an object metadata query, and to return a metadata collection to the distributed processing system.

In some embodiments, the distributed processing system comprises a Hadoop cluster. The metadata formatting module may generate metadata records in Apache Avro format, Apache Thrift format, Apache Parquet format, Simple Key/Value format, JSON format, Hadoop SequenceFile format, or Google Protocol Buffer format. In other embodiments, the distributed processing system comprises an Apache Spark cluster

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

The term "secondary index" is used herein to describe an indexing mechanism for properties of an object other than its primary identifier (e.g., the object's "primary key"). Secondary indexes can provide efficient access to data based on properties of the data other than its primary key.

Figure 1:
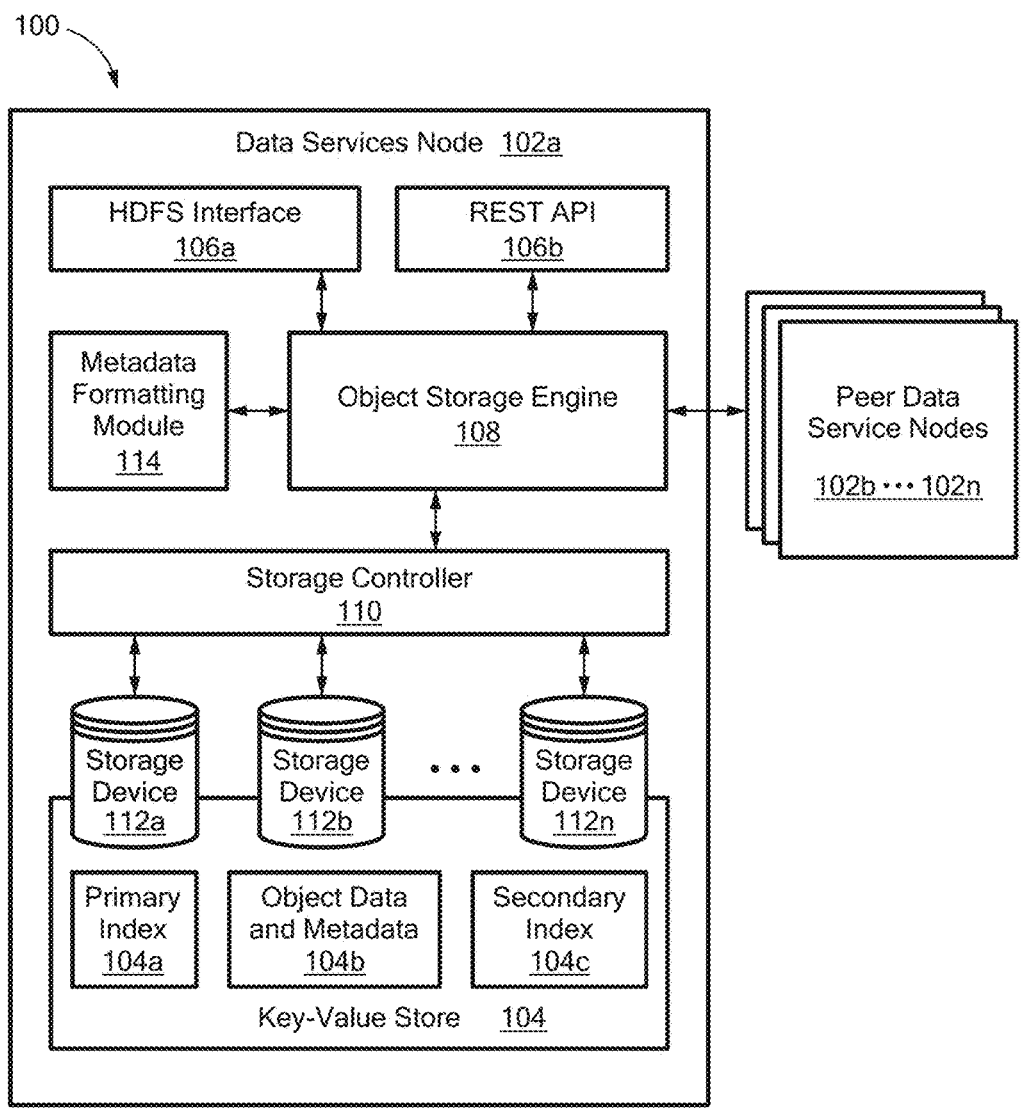
FIG. 1 is a diagram of an illustrative distributed object store.

Referring to FIG. 1, an illustrative distributed object store 100 comprises a plurality of data service nodes 102*a*-102*n* operatively coupled to each other via a high-speed data channel or network, such as a local-area network (LAN) or a wide-area network (WAN). In certain embodiments, data service nodes 102 communicate peer-peer over IPC using Google Protocol Buffers.

The distributed object store 100 is capable of storing and retrieving object data and associated metadata. Objects may be uniquely identified within the system using an object key comprising one or more namespace identifiers and a unique object id within the identified namespace. In some embodiments, the namespace identifiers include a tenant id and a bucket id, where the tenant id uniquely identifies a tenant (i.e., a customer, a user, or any other top-level entity) within the distributed object store and the bucket id uniquely identifies a collection of objects (or "bucket") defined by and belonging to the tenant. The tenant, bucket, and object ids can be any suitable values, such as strings, numbers, or a combination thereof.

Various types of clients (not shown) can use the distributed object store 100 to store and retrieve object data and metadata via a network (e.g., the Internet). The clients may include command-line applications, web applications, mobile applications, MapReduce (MR) jobs, or any other type of application concerned with object storage and retrieval.

Any one of the data nodes 102 may be capable of receiving and processing client requests. In some embodiments, a client can direct requests to a specific one of the data service nodes 102*a*-102*n*. In various embodiments, a load balancer (not shown) is provided between the clients and the data service nodes 102. Thus, a client may direct requests to the load balancer, which in turn selects one of the data nodes 102 to service the request and forwards the request thereto. Any suitable load balancing techniques can be used.

In addition to processing client requests, a given data service node 102 can manage one or more storage devices 112 in which object data and metadata is stored. To facilitate scaling up storage capacity, the entire set of data stored within the system 100 may be partitioned across the plurality of nodes 102 such that no single node stores or otherwise manages the entire dataset. Objects belonging to a common tenant or bucket may be split across storage devices 112 and/or nodes 102. In some embodiments, a data or metadata for a single object may be split into "shards" and stored across multiple storage devices 112 and/or nodes 102. To improve fault tolerance and data availability, object data and/or shards may be replicated across multiple storage devices 112 and/or nodes 102 according to a configurable replication policy. It will be appreciated that the aforementioned storage architecture allows object data and metadata to be written/read in parallel to/from multiple storage devices 112 and data nodes 102, improving I/O performance.

In this example, the system 100 includes a first data service node 102a, which is shown in detail, and one or more peer data nodes 102b-102n. The term "peer" is used herein to describe nodes that are generally identical in functionality and/or structure. Accordingly, the peer data nodes 102b-102n may similar (or even identical) to the first node 102a. In some embodiments, each node 102 corresponds to a separate physical and/or virtual computing platform. In certain embodiments, a data service node 102 comprises off-the shelf server hardware and/or software, e.g., a Windows server, a Sun Solaris server, an HP server, a Linux server, etc. Processing and storage capabilities of the system 100 can readily be scaled up by adding data service nodes 102.

The illustrative data service node 102a includes one or more interfaces 106, an object storage engine 108, a storage controller 110, one or more storage devices 112, and a metadata formatting module 114. The various components 106-114 may be coupled as shown, or in any other suitable arrangement.

A data service node 102 can be associated with an arbitrary number of storage devices 112a-112, as shown. A storage device 112 may be local to the data node 102a, or may be part of a network-attached storage (NAS) system. For example, two or more data service nodes 102 may be coupled to a common storage array, whereby storage devices 112 correspond to logical unit numbers (LUN) therein. In certain embodiments, storage devices 112 are managed by a local storage controller 110. In other embodiments, the storage controller 110 may be provided by a storage array.

To support a diverse set of client applications, the distributed object store 100 includes one or more interfaces (sometimes referred to as "adapters") 106. A given interface 106 may implement application-programming interfaces (APIs) built on top of conventional network communication protocols such as TPC/IP and HTTP, data-interchange formats such as Extensible Markup Language (XML) and JavaScript Object Notation (JSON), and/or remote procedure call (RPC) frameworks such as Apache Thrift. In this example, the illustrative data services node 102a includes an HDFS interface 106a and one or more REST APIs 106b.

The HDFS interface 106a enables Hadoop applications, Apache Spark applications, and other HDFS-compatible clients to access data from the distributed object store 100. Specifically, the HDFS interface 106a implements various NameNode and DataNode operations necessary to provide a Hadoop Compatible File System (HCFS). The HDFS interface 106a provides an HDFS "head" that allows buckets to appear as directories, and objects to appear as files in the Hadoop File System format.

The HDFS interface 106a can also expose object metadata to HDFS, making object metadata available for distributed processing and analysis. In various embodiments, metadata for all object's in given bucket is exposed as a collection of metadata records. In some embodiments, the HDFS interface 106a may be augmented to allow a distributed processing system (e.g., Hadoop) to pose sophisticated queries over object metadata, referred to herein as "metadata queries." In this case, only only objects in the bucket satisfying the metadata are exposed to HDFS. The collection and/or records may be formatted so as to be compatible with the distributed processing system using the metadata formatting module 114, as discussed further below. For example, in the case of Hadoop, all metadata for a given bucket may be exposed as a single HDFS "file." Advantageously, the distributed processing system 100 can support many different metadata formats.

The REST APIs 106b may include an API compatible with the Amazon's S3 API and/or an API compatible with OpenStack's Swift API. It will be understood that these REST APIs generally provide a set of bucket-based operations and a set of object-based operations. Non-limiting examples of bucket-based operations exposed via a REST API include: creating a bucket, updating bucket information, deleting a bucket, and retrieving a list of objects within a bucket (sometimes referred to as a "list bucket operation"). In some embodiments, a metadata query may be included within a list bucket request, and only objects in a bucket satisfying the query are returned within the corresponding response. Non-limiting examples of object-based operations include: add an object with data and optionally metadata, retrieve an object's data and metadata, retrieve only metadata for an object, update an object's data and metadata, and delete an object. In some embodiments, the HTTP request method is used to determine the type of operation being requested (e.g., "POST" may be used to add an object, "GET" to read the object, and "PUT" to update the object).

It should be understood that additional interfaces 106 can be readily provided. For example, a data services node 102 could include a Graphical User Interface (GUI), command-line interfaces, or other types of application or user interfaces.

As mentioned above, the distributed object store 100 can shard object data and metadata across multiple storage devices 112 and nodes 102 and, further, may store multiple replicas of object data/metadata to improve fault tolerance and data availability. To track the location of object data across the plurality of storage devices 112 and nodes 102, the system 100 may include mapping between object keys and storage locations, referred to herein as the "primary index." In various embodiments, a primary index 104a is implemented using a key-value store 104 stored within the storage devices 112.

Those skilled in the art will understand that distributed key-value stores provide high performance, massive scalability, and fault-tolerance and typically do not impose a schema on the stored data. In various embodiments, the key-value store 104 is a commercial off-the-shelf (COTS) key-value store such as Riak, MemcacheDB, or Voldemort. It will also be understood that some key-value stores provide not only the ability to retrieve a value for a single key (referred to herein as a "GET" operation), but also the ability to retrieve key-value pairs for a range of a keys that match a given prefix (referred to herein as a "PREFIX-GET" operation). In some embodiments, the key-value store includes a B+Tree implementation, a journal, and an in-memory cache.

Using these and other features of the key-value store 104, a primary index 104a can be implemented to provide an efficient mapping between object keys and storage locations. As mentioned above, objects can be uniquely identified within the distributed object store 100 from the combination of tenant id, bucket id, and object id. The primary index 104a may use the key format "<tenant id>.<bucket id>.<object id>." Thus, information about all objects within a bucket can be retrieved by issuing a PREFIX-GET operation on the primary index 104a using the prefix "<tenant id>.<bucket id>." This technique can be used to efficiently implement a "bucket scan" operation, as discussed below. It will be appreciated that other key formats can be used.

In some embodiments, the object data and/or object metadata is also stored within a key-value store 104. Thus, as shown in FIG. 1, a single key-value store 104 can be used to store both the primary index 104a and the object data/metadata 104b upon a common set of storage devices 112. The key-value store 104 may also be used to store a secondary index 104c for efficient object retrieval based on properties of object metadata itself. The use of a secondary index 104c can make certain object retrieval patterns relatively more efficient, as described further below.

The object storage engine (or "storage engine") 108 processes requests to read and write object data and metadata. In some embodiments, the storage engine 108 includes an internal API used by the interfaces 106. Thus, for example, a given interface 106a, 106b can receive a client request using an external API, translate the request into one or more internal API operations, execute those internal API operations against the storage engine 108, and return an appropriate response to the client according to the external API.

As discussed above in conjunction with the REST-based API 106b, the system 100 may support operations to store and retrieve data/metadata for a given object, and a "list bucket" operation to retrieve all (or, in the case of a metadata query, a subset of) object data/metadata for a given bucket. To implement such operations, the storage engine 108 first determines the corresponding object storage location(s) using the primary index 104a. For example, to retrieve data for a single object, the storage engine 108 determines the object's storage location (or possibly multiple storage locations if sharding or replication are used) by issuing a GET operation to the key-value store 104 using a specified tenant id, bucket id, and object id. As another example, to retrieve all object data in a bucket, the storage engine 108 determines a storage location (or multiple storage locations) for each object in the bucket by issuing a PREFIX-GET operation to the key-value store 104. Once the storage locations are known, the storage engine 108 can proceed with the read/write operation. For storage locations that are local to its node (node 102a in this example), the storage engine 108 can issue read/write commands to a local storage controller 110, which in turn reads/writes data from an appropriate storage device 112. In some embodiments, local object data and/or metadata is read from (and written to) the key-value store 104b. For remote storage locations, the storage engine 108 may issue remote commands to the appropriate peer nodes 102b-102n, which read/write data from their locally managed storage devices and return data (or a write acknowledgement) to the original node 102a.

In various embodiments, the distributed object store 100 is based on ViPR Object Data Services by EMC Corporation, a massively scale-out, geo-replicated object store. ViPR Object is compatible with various commercially available file-based storage solutions, such as EMC Isilon® and VNX®, and NetApp® storage systems. Thus, for example, the storage controllers 110 and/or storage devices 112 may be provided by (or form a part of) a commercial available file-based storage solution.

Figure 2:
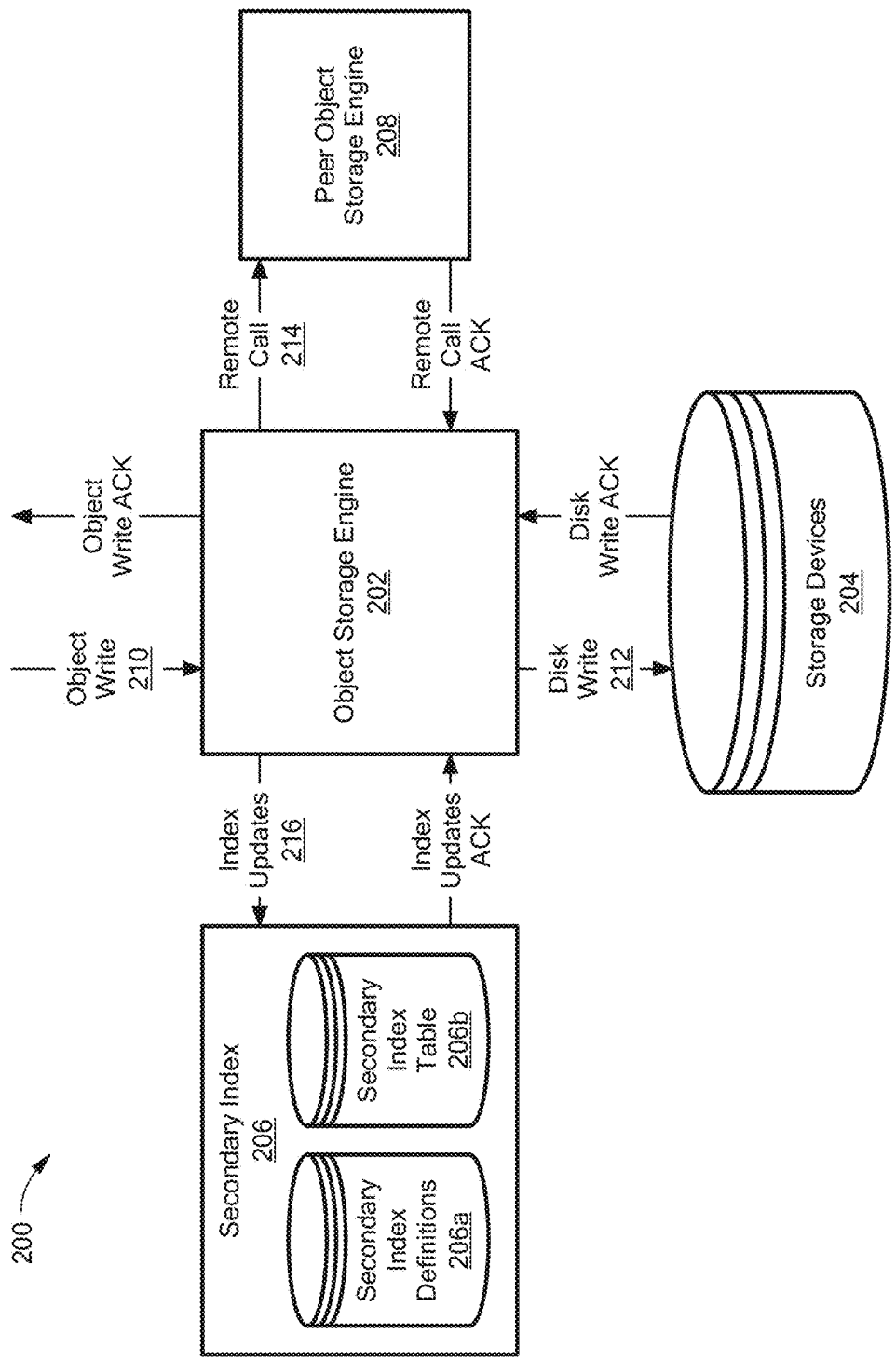
FIG. 2 is a diagram of a distributed object store illustrating use of a secondary index.

Referring to FIG. 2, an illustrative distributed object store 200, which may be the same as or similar to storage system 100 of FIG. 1, includes an object storage engine 202, storage devices 204, and a secondary index 206. The storage system 200 may also include peer object storage engines 208.

The secondary index 206 comprises secondary index definitions 206a and a secondary index table 206b. The index definitions 206a include information about any secondary indexes that have been created (e.g., by a user), including the index name, the indexed metadata keys, and any cached metadata keys. The index table 206b maintains a mapping between one or more indexed object metadata properties (i.e., metadata key-value pairs included within the key) and one or more cached object metadata properties (i.e., metadata properties, including the object id, included within the value), wherein each row in the table corresponds to a stored object. It will be appreciate that the use of secondary indexes can make certain object retrieval patterns much more efficient. In various embodiments, the secondary index table 206b is stored within a distributed key-value store (e.g., key-value store 104 of FIG. 1). The index definitions 206a could be stored within the same key-value store, a different key value store, a relational database, in memory data structure, configuration files, or using any other suitable mechanism.

Secondary indexes can be defined (i.e., created and updated) by a user, such as an application developer or database engineer, based on an application's data access patterns. Secondary indexes are defined on a specified bucket owned by a particular tenant. A user can define an arbitrary number of secondary indexes on a given bucket, although it will be understood that the number and type of secondary indexes presents a tradeoff between read and write performance. A secondary index can be declared by a developer using a variety of means, including a REST-based API, a programming language-based API, and/or an interactive command line application (e.g., a "shell").

TABLE 1

Create Secondary Index Example

POST http://Employee.someNamespace.OrgTenant.org/index
<create_index>
  CREATE INDEX employee-city-age (city, age) CACHE (name, empID)
</create_index>

TABLE 1 illustrates a request to create an index using a REST-based API. The request includes a "CREATE INDEX" declaration having index name "employee-city-age," index metadata keys "city" and "age," and cache metadata keys "name" and "empID." As specified via the REST URL, the index is declared within the "Employee" bucket associated with the tenant "OrgTenant.org." It will be appreciated that the index is a composite-type index because it includes multiple metadata keys ("city" and "age"). The cache metadata keys, declared using the "CACHE" keyword, correspond to metadata properties that would be cached (i.e., duplicated to potentially improve performance) within secondary index table 206b. In general, an index declaration includes one or more index metadata keys and zero or more cache metadata keys.

The successful processing of the create index request is the establishment of a data structure within the object system (more specifically the index definitions 206a) such that when an object is inserted, updated, or deleted in the bucket, the secondary index table 206b can be correspondingly updated. When an object is inserted, a new key-value entry is entered into the secondary index table in the object system. For example, using the example of TABLE 1, the values of an object's "city" and "age" metadata properties would be combined with the tenant id, the bucket id, the index name, and the object id to form the key. The value is a combination of the object's name and any metadata properties declared in the CREATE INDEX statement (e.g., "name" and "empID" in the example of TABLE 1). When an object is updated, if that update affects any of the metadata properties in the secondary index, the key-value entry in the secondary index table 206b is modified to reflect those changes. When an object is deleted, the corresponding key-value pair is removed from the secondary index table 206b. A user can declare multiple secondary indexes on a given bucket, in which case each object insert/update and delete operation may affect multiple key-value entries in the secondary index table 206b, one per secondary index declared on the bucket.

TABLE 2

| Key | Value |
| --- | --- |
| OrgTenant.Employee.employee-city-age.city.Seattle.age.49.ObjectA | ObjectA.name.Jane Smith. empID.123 |
| OrgTenant.Employee.employee-city-age.city.Boston.age.23.ObjectB | ObjectB.name.Fred Jones. empID.456 |

TABLE 2 is an example showing the result of multiple object insert operations on the secondary index created in TABLE 1. More specifically, the first row corresponds to an object having object id "ObjectA" with metadata properties: city=Seattle, age=49, name=Jane Smith, and empID=123 (other metadata properties may also be defined, but are not duplicated in this illustrative secondary index). Likewise, the second row corresponds to an object having object id "ObjectB" with metadata properties: city=Boston, age=23, name=Fred Jones, and empID=456. It should be appreciated that, using the key-value store's PREFIX-GET operation, the distributed object store 200 can efficiently find the object ids of employee's within a given city, or employee's within a given city and of a certain age. Moreover, because the "name" and "empID" metadata properties are cached as part of the "employee-city-age" index, these values would be retrieved as part of the same PREFIX-GET operation. Because the secondary index information is accessible using a B+Tree format, certain operations, such as retrieving all objects in the Employee bucket where the value of the "city" property is "Seattle" can be executed in O(log N) time.

For operations that modify object data and/or metadata (e.g., create object, update object, and delete object), the secondary index table 206b may be updated to maintain consistency. Ideally, these changes should occur within a transaction so that the object's data and metadata together with updates to the secondary index are changed atomically (i.e., either all changes are persisted or, in the case of an error, none of the changes are persisted). In various embodiments, the secondary index update mechanism can be integrated with the object insert/update/delete transaction system provided by ViPR Object Data Service.

FIG. 2 also illustrates a technique for updating object data along with secondary index table 206b. At step 210, an object write request is received from a client (e.g., a REST client, a MapReduce job, etc.) at an object storage engine 202 (i.e., any data node) and, at step 212, the data is written to disk. The ownership of the object is determined and, at step 214, a remote call is sent to the owning data node (e.g., peer object storage engine 208) to update the Journal, Memory Table, etc. to reflect the location of the write. The remote call can utilize inter-process communication (IPC), a remote procedure call (RPC), a message-passing technique, or any other suitable inter-process and/or inter-host communication technique.

At step 216, the object storage engine 202 uses secondary index definitions 206a to determine which, if any, secondary indexes may need to be updated based upon the written object's tenant id, bucket id, and metadata properties. For each secondary index defined on the bucket, the object storage engine 202 potentially updates entries in the secondary index table 206b. In the case of an object create operation, new key-value pair entries may be inserted into the secondary index table 206b if the object has the metadata properties specified in any of the bucket secondary indexes (specified either as indexed metadata or cached metadata). For update operations, if the update operation modified metadata properties involved in any secondary index, key-value pairs are updated. For a delete operation, any associated key-value pairs in the secondary index table 206b can be deleted. Multiple secondary index operations can occur in parallel to reduce latency.

The object storage engine 202 waits for the acknowledgements of success ("ACKs") for the disk write, remote call, and secondary index update steps 212-216 before returning an acknowledgement to the client. In general, if any of these steps fail, the system 202 guarantees that the entire operation fails, thus providing transaction semantics to the client.

Figure 3:
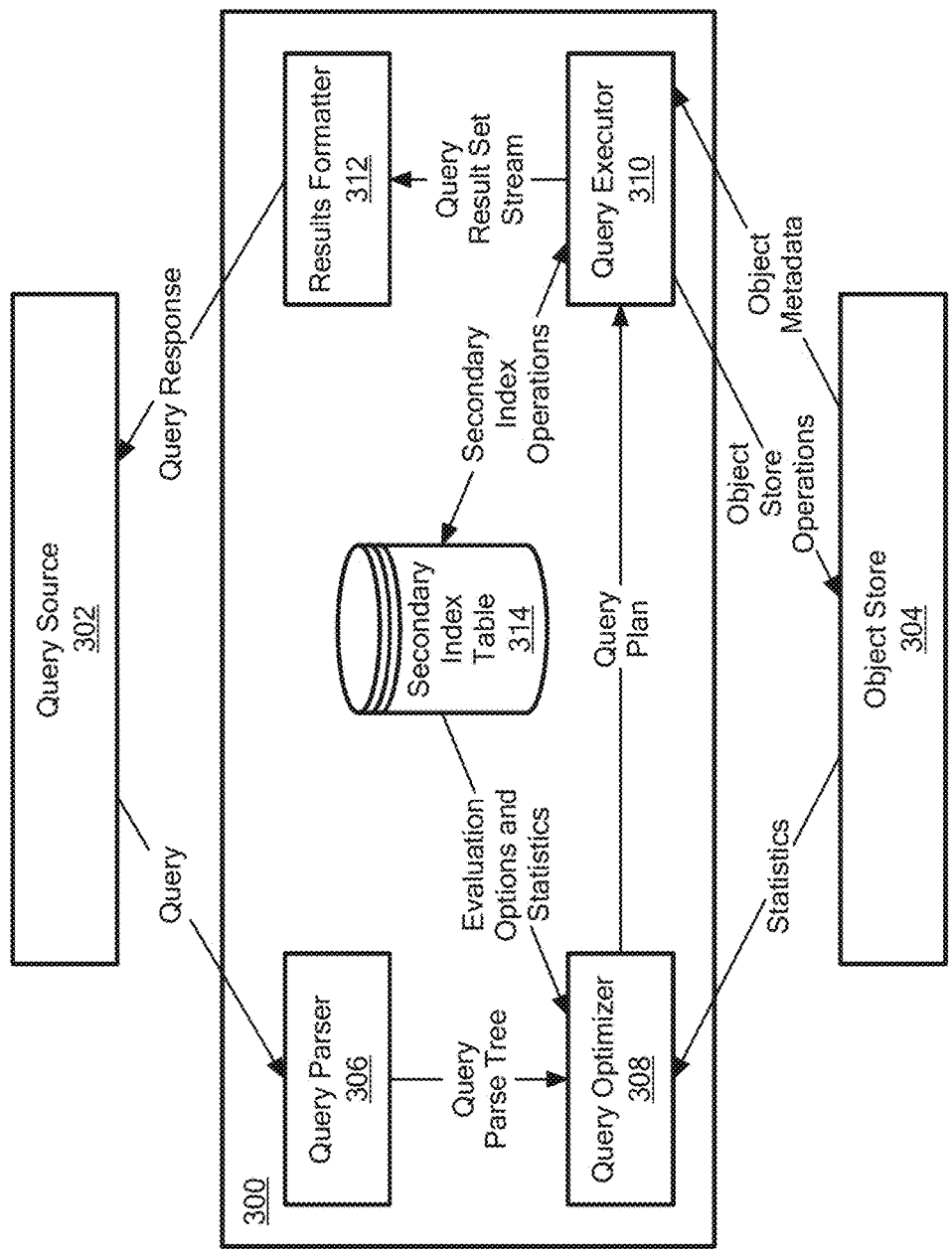
FIG. 3 is a diagram of an illustrative object query service that could form part of the distributed object stores of FIG. 1 or 2.

Referring to FIG. 3, an illustrative object query service 300 receives object metadata queries (or more simply "queries") from a query source 302, processes the query, and issues corresponding operations to an object store 304. The illustrative object query service (or more simply "query service") 300 includes a query parser 306, a query optimizer 308, a query executor 310, and a results formatter 312, operatively coupled as shown. The query service 300 also includes (or otherwise utilizes) a secondary index table 314.

In various embodiments, the query service 300 forms a part of a distributed object store, such as distributed object store 100 of FIG. 1. In some embodiments, the query service 300 forms part of an object storage engine, such as object storage engine 108 in FIG. 1. In various embodiments, the secondary index table 314 is the same as or similar to the secondary index table 206b of FIG. 2.

The query parser 306 receives an object metadata query from the query source 302 and parses the query to generate a query parse tree. In certain embodiments, a query can be posed using a REST-based API, wherein the query is specified within a Hypertext Transfer Protocol (HTTP) request body or header. In some embodiments, an interface 106 (FIG. 1) extracts the query from the HTTP request. Thus, it will be appreciated that existing REST-based APIs, such as S3 and Swift, can be readily extended to support the various types of object metadata queries described herein.

An object metadata query can be expressed in a high-level query language modeled on Structured Query Language (SQL). The high-level language, referred to herein as the Object System Query Language (OSQL), is a predicate-based query capability to allow clients to declaratively specify what subset of the objects they are interested in retrieving, without having to specify how those objects are retrieved from the object store 304.

TABLE 3 shows the syntax of OSQL, according to some embodiments. As with SQL, ordering is assumed to be ascending ("ASC") unless explicitly specified as descending ("DESC").

TABLE 3

OSQL Syntax

SELECT(* | metadataKeyName (AS aliasName)? [, metadataKeyName (AS aliasName)?]*
  (FROM bucketName (AS bucketAlias)? )?
  (WHERE queryExpression)?
  (ORDER BY metadataKeyName (ASC | DESC)? [, metadataKeyName (ASC | DESC)?]*] )?

TABLE 4 illustrates an OSQL query posed using a REST-based API. In this example, the bucket id ("Employee") and tenant id ("OrgTenant") are specified within a POST URL, and the query is included within the POST body. Alternatively, the bucket id could be specified using a "FROM" clause. The illustrative query of TABLE 4 declares that the result set should include the "city," "age," and "name" metadata properties, along with object ids, for employees associated with the city of "Seattle" who are older than 25. The query also declares that the result set should be sorted by "name."

TABLE 4

OSQL Query Example

POST http://Employee.someNamespace.OrgTenant.org/query
<query>
  SELECT Key AS ObjectID, city, age, name
  WHERE city = "Seattle" AND age > 25
  ORDER BY name
</query>

In addition to OSQL, object metadata queries can be posed using a simplified form of query syntax referred to herein as "simple predicate queries." A simple predicate query can be included as a URL parameter to various API operations, including operations specified via GET requests. For example, the S3 "list bucket" operation can be extended to take a simple predicate query as a URL parameter; if a query is specified, only objects that satisfy the query are used in the response. As another example, the HDFS interface 106a can be extended to accept simple predicate queries and return a collection of metadata records for a bucket restricted by the query.

TABLE 5

Simple Predicate Expression Syntax queryExpr = predicate [connector predicate]*
predicate = metadataKeyName operator valueTerm |
  (metadataKeyName operator valueTerm)
connector = AND | OR | NOT
operator = EQ | IN | BETWEEN | LIKE
valueTerm = metadataValue | (metadataValue AND metadataValue)
  | (metadataValue [metadataValue]*) | pattern TABLE 5 shows a simple predicate query syntax, according to some embodiments.

TABLE 6 shows an illustrative simple predicate query specified as a URL parameter on a list bucket request. The illustrative query of TABLE 6 declares that the result set should information about employees associated with the city of "Seattle" who are older than 25. In practice, URL encoding may be applied to the expression when included within a URL (e.g., spaces would be represented as "%20"). For readability, URL encoding is not shown in TABLE 6.

TABLE 6

OSQL Query Example

GET http://Employee.someNamespace.OrgTenant.org/query?q=city EQ "Seattle" AND age GT 25

The query parser 306 can use conventional query parsing techniques to parse an object metadata query into a query parse tree. Those skilled in the art will understand how to adapt existing SQL parsers to parse and/or validate OSQL queries based on the above syntax descriptions. For syntactically correct queries, the result of the query parsing is a query parse tree that is passed to the query optimizer 308.

The query optimizer 308 determines the most efficient way to evaluate the query against objects in a specified bucket to generate the result set. The query optimizer 308 generates one or more query plans based on the query parse tree and evaluates those query plans according to a cost model, to select a plan to be executed. It will be appreciated that, because OSQL is a declarative language (i.e., clients specify what is to be queried but not how), the query optimizer 308 has freedom to consider query plans. This allows the query service 300 to select the "best" approach for translating the query into a set of steps that can be executed against the object store 304.

In some embodiments, the query optimizer 308 uses a four-part approach: (1) generate an initial "logical" query plan that reflects the semantics of the query (this step may be performed by the query parser 306, as described above); (2) use relational algebra rules to generate one or more logical query plans that represent semantically equivalent approaches to resolving the query; (3) use transformation rules to generate one or more "physical" query plans for each candidate logical query plan; and (4) evaluate the physical query plans based on a cost model to select the least cost alternative, which is submitted to the query executor 310 for execution.

As used herein, the term "logical query plan" refers to a representation of a query that satisfies the query's semantics without dictating how the query is executed. In contrast, a "physical" query plan is a query representation that specifies how the query should be executed. A logical query plan includes logical operators that do not necessarily correspond to processing performed by the query service 300 or the object storage 304 (referred to herein as "logical operators"), whereas a physical query plan includes operators that do correspond to processing performed by the query executor 310 and/or the object store 304 (sometimes referred to as "physical operations"). Although any suitable logical operators can be used, non-limiting examples include "Retrieve objects from bucket," "Filter," "Project," and "Sort." In various embodiments, the query service 300 uses tree representations for logical and/or physical query plans. In such representations, each node generally corresponds to a specified logical/physical operator.

Figure 4:
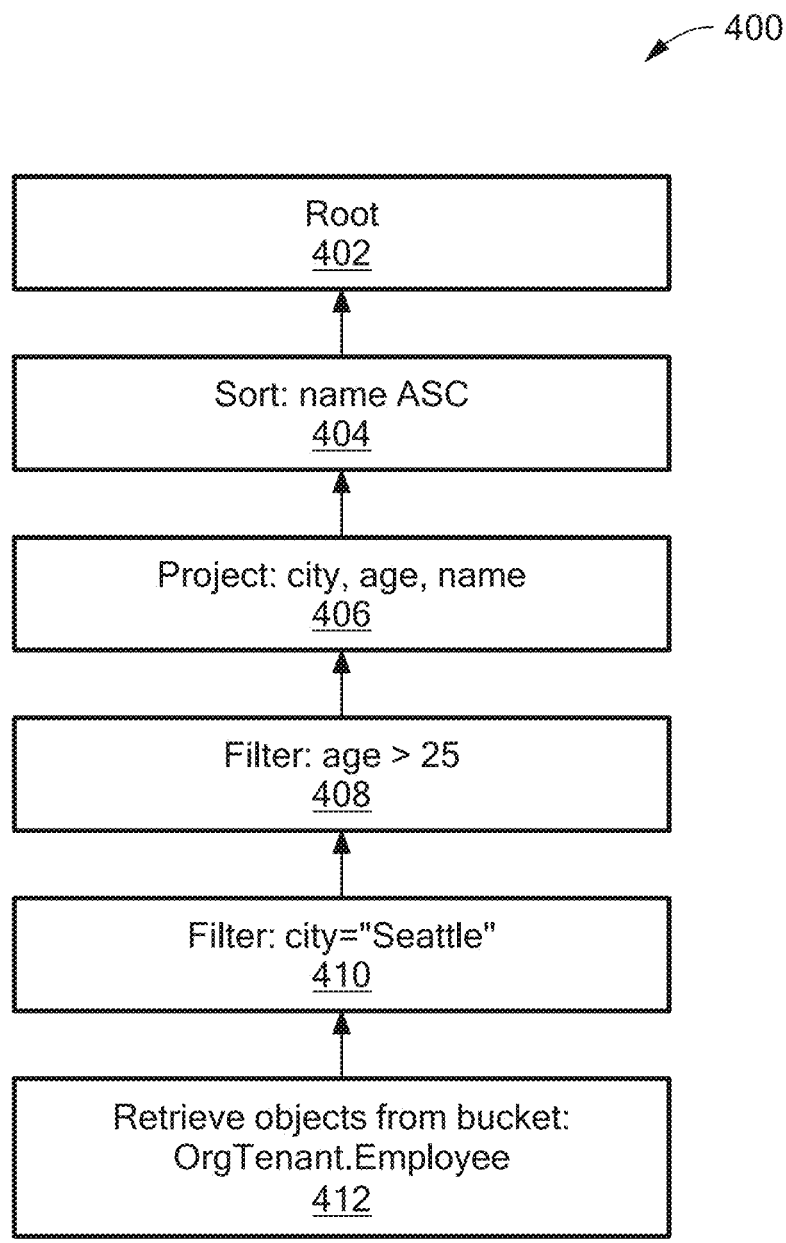
FIG. 4 is a diagram of an illustrative logical query plan.

An initial logical query plan can be derived from the query parse tree using any suitable strategy. One strategy for forming the initial logical query plan is illustrated in FIG. 4, which shows a logical query plan 400 corresponding to the OSQL query of TABLE 4. First, the tree representation 400 is initialized with root node 402. Next, a "Sort" operator node 404 is added based on information within the "ORDER" clause, if present. Next, a "Project" operator node 406 is added based on projection information within the "SELECT" clause. Next, "Filter" operator nodes 408 and 410 are added based on predicate information within the "WHERE" clause. Finally, a leaf node 412 is added using tenant/bucket information within the "FROM" clause (or using tenant/bucket information within the URL).

As the initial query plan is being formed, optimization can occur based on applying predicate logic rules to simplify and eliminate redundancy that may appear in the query. Existing heuristics and rules can be applied, allowing the query optimizer 308 to consider optimizations by rearranging the operators in a way that preserves query semantics.

The initial logical plan can serve as the basis for generating alternative logical query plans that also satisfy the semantics of the query submitted by the client. Any techniques known in the art, such as relational algebra transformation rules, may be used to generate alternative logical query plans. For example, referring to FIG. 4, alternative logical query plans could be derived from the initial logical query plan 400 by rearranging some of the steps, such as by swapping nodes 404 and 406 to perform the sort operation before the project operation. The initial and alternative logical query plans are collectively referred as the "candidate logical query plans."

The candidate logical query plans can be translated into physical query plans by mapping logical operators to "physical" operators defined within the query executor 310 and/or object store 304. In certain embodiments, the available physical operators are those shown in TABLE 7.

The query optimizer 308 uses any suitable strategy to transform a logical query plan into one or more physical query plans. For example, the query optimizer 308 can apply a set of transformation rules to the logical operators. A secondary index might be useful to make the retrieval of object metadata fields or evaluation of a predicate more efficient. This depends on the set of fields in the index, the sort order, and the metadata properties involved in the logical operation. The transformation rules are embodied in a physical plan generation strategy. In certain embodiments, the query optimizer 308 uses the "Strategy" software design pattern, allowing multiple strategies to be evaluated.

TABLE 7

| Physical Operator | Description | Implementation Example |
| --- | --- | --- |
| Bucket scan | Retrieve all metadata for all objects in a bucket | This operation can be implemented by issuing a PREFIX-GET on the primary index using the prefix"<tenant id>.<bucket id>" and then retrieving the resulting list of object metadata from storagedevices. |
| Index Seek | Retrieve cached metadata for objects satisfying given criteria for a named secondary index | Issue a PREFIX-GET on the secondary index using the prefix"<tenant id>.<bucket id>.<index name>.<criteria key>.<criteriavalue>" |
| Object retrieval | Retrieve all metadata for a single object by its object key | This operation can be implemented by issuing a GET operation on the |

TABLE 7-continued

| Physical Operator | Description | Implementation Example |
| --- | --- | --- |
| | | primary index to determine the object's storage location, and then retrieving the object's metadata using that storage location |
| Predicate evaluation | Evaluate a given predicate against a stream of object metadata | Any suitable comparison routines can be used, such as string comparison routines and numeric comparators |
| Project | Reduce a stream of object metadata to a given set of metadata keys. In this context, metadata may include object ids. | Any suitable mapping techniquecan be used |
| Sort | Sort a stream of object metadata using one or more given metadata keys | Any suitable sorting technique can be used, such as Quicksort with an alphanumeric comparator |

Figure 5:
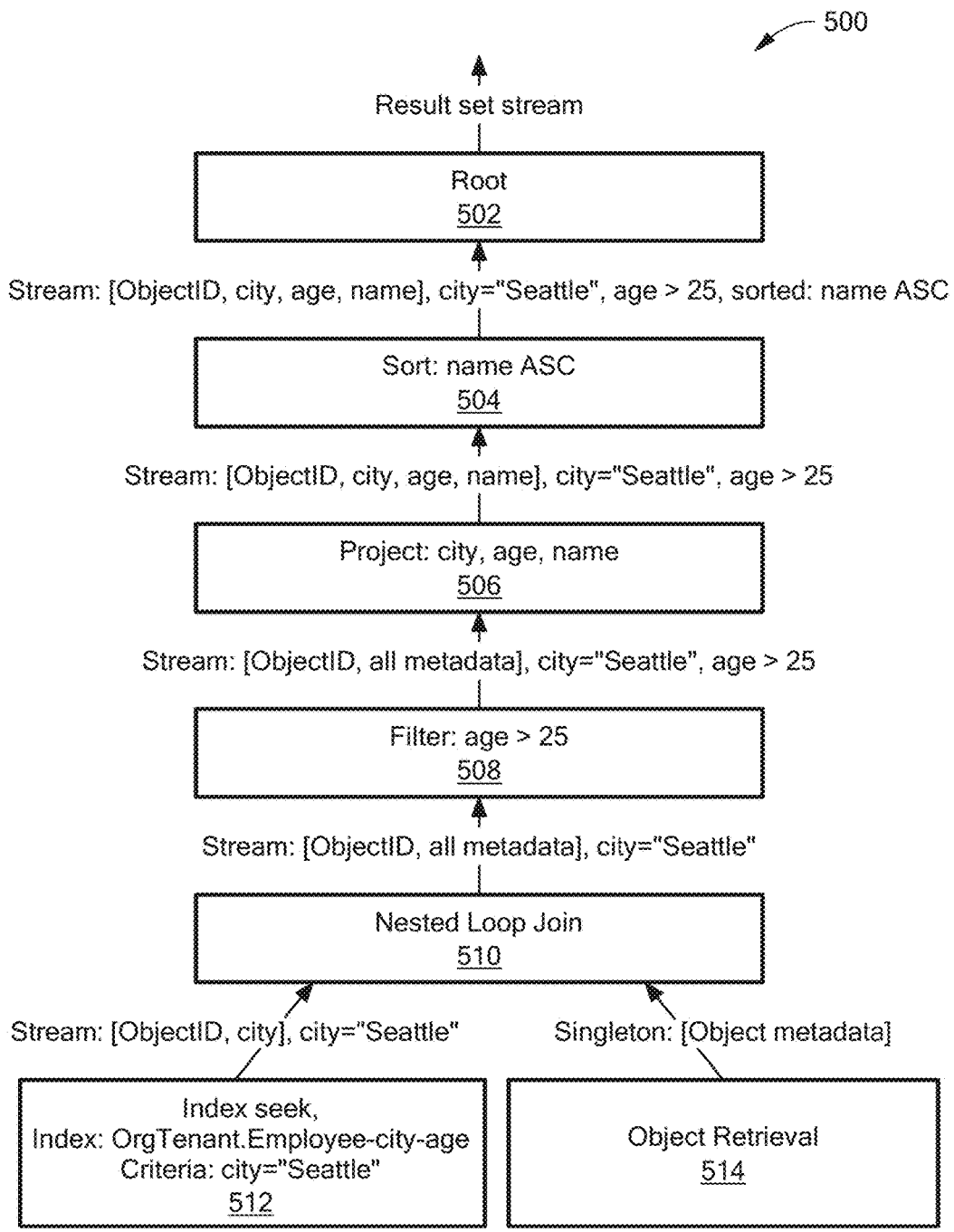
FIG. 5 is a diagram of an illustrative physical query plan corresponding to the logical query plan of FIG. 4.

FIG. 5 illustrates one possible physical query plan 500 that can be derived from the logical query plan 400 of FIG. 4. In the following discussion it is assumed that the "employee-city-age" secondary index has been created within the "Employee" bucket, as shown in TABLE 1.

The physical query plan 500 includes a root node 502 and physical operator nodes 504-514. At a high level, the illustrative query plan 500 uses the secondary index named "employee-city-age" to retrieve only those objects satisfying the predicate "city=Seattle," and subsequently filters the objects by "age" and sorts them by "name." This strategy may be desirable if a relatively small percentage of employees satisfy the criteria "city=Seattle" because it would reduce the number of objects retrieved. An alternate query plan could use a different secondary index (not described here) that organizes metadata entries within the secondary index table 314 based on "age," so that employees within a certain age range can be efficiently identified.

In some embodiments, the key-value store (and, thus, the secondary index table 314) maintains keys in sorted order (e.g., alphanumeric order). Accordingly, another physical query plan could perform a PREFIX-GET on the key-value store using the prefix "OrgTenant.Employee.name" to retrieve employees sorted by name, and subsequently filter by name and age. The last strategy requires all objects in the bucket to be retrieved, but avoids a subsequent sort step.

The candidate physical query plans, generated for all logical query plans, are evaluated based on a cost model to determine the least cost (or "best") alternative. A physical query plan can be associated with a cost, which estimates of the time and/or processing resources that may be required to execute that plan. Although the costs are only estimates that do not necessarily reflect the reality of executing the query against the real data in the bucket, utilizing a cost model allows the query optimizer 308 to perform a "best effort" comparison of different plans.

To cost a physical query plan, each node is assigned a cost based on its corresponding physical operation, wherein the cost of the query plan's root node is the aggregate cost of the entire query plan. To cost a physical operation, the query optimizer 308 can use a combination of heuristics along with statistical/historical information. For example, the object store 304 could maintain statistics about the number of objects the bucket; the average object metadata size; the number of blocks required to store the bucket; the blocking factor of the bucket (i.e., the number of object metadata entries that fit into one block); the number of distinctive metadata keys; the number of distinctive metadata values for a given key; the minimum and maximum possible values for a given metadata key; the selectivity of a metadata key, which is the fraction of objects satisfying an equality condition on the metadata key; and the selection cardinality of a given metadata key, which is the average number of objects whose metadata satisfies an equality condition on that key. Any suitable combination of these various statistics could be used to estimate a cost for a given physical operation.

An example heuristic is to use statistics on the distribution of data based on certain metadata keys, for example keys in a secondary index. At some additional cost to insert, update and delete operations on objects, statistics could be kept to say how many objects have the value of age in particular buckets (e.g., 0-10, 10-20, 20-30, etc.) these statistics could suggest if the secondary index would be likely to be more efficient than a bucket scan. Thus, for example, if the statistics indicated that 95% of the objects had value of age greater than 25, the secondary index scan would not eliminate many objects from the result set and therefore the bucket scan would be more efficient than using the secondary index. As another example, if the statistics indicated that only 1% of the objects had the city "Seattle," the physical query plan 500 of FIG. 5 is far more efficient relative to performing full bucket scan.

Based upon the cost model evaluation, a physical query plan is selected and submitted to query executor 310 for evaluation. In various embodiments, the plan with the lowest estimated cost is selected. It will be understood that the set of alternative query plans could be quite large and, thus, generating and evaluating all alternative plans can be cost prohibitive. Accordingly, in some embodiments, the query optimizer 308 balances the cost (in time and resources) of determining a "best" query plan versus the savings (in time and resources) of executing the "best" plan compared to a plan that may initially be considered less efficient.

The query executor 310 traverses the selected physical query plan from the leaf nodes up to the root node, generating intermediate results for inner nodes (i.e., non-leaf, non-root nodes). The final result set of the query is generated by evaluating the root node of the selected query plan. In some embodiments, the results of executing a node is a stream of tuples, wherein each tuple includes an object id and/or object metadata for a given object. For example, if a node includes predicate evaluation (e.g., "Filter"), the output of the node is a stream of tuples for which the predicate evaluated to true. Thus, using pipelining, node execution includes consuming an input stream of tuples and evaluating those tuples in some fashion to produce an output stream. Certain operations (e.g., predicate evaluation and project) can commence without having access to the entire input stream and, thus, pipelining techniques known in the art can be applied thereto. Other operations, such as sort, require access to the entire input stream before processing can begin.

In some embodiments, the query executor 310 performs pagination. The pagination parameters can be explicitly specified by a client, or could be defaults within the distributed object store. For example, following the S3 API, a client could specify "max-keys" and "marker" parameters within certain REST operations, which specify that maximum number of results to be returned and an lexicographical starting point for returned object ids, respectively. Using these parameters, it will be appreciated that a client can iteratively retrieve a large result set in relatively small batches.

As an example of query executor 310 processing, consider the illustrative physical query plan of FIG. 5 (which may correspond to the query of TABLE 4). The query executor 310 begins by processing leaf node 512, where an index seek operation is performed using the secondary index on "city" to produce a stream of [ObjectID, city]. The tuples could also include any cached metadata properties defined on this index.

More specifically, the query executor 310 would do a PREFIX-GET on the secondary index table 314 using the prefix "OrgTenant.Employee.city.Seattle" to retrieve key-value pairs and to generate the stream of tuples therefrom. This stream can be processed via node 510, which iterates through the tuples on the input stream from node 512 and performs an object retrieval operation (node 514) for each object id in the stream. The retrieved objects and "joined" with the stream to generate a stream of [ObjectID, all metadata] tuples (where "all metadata" refers to the list of all metadata properties defined on an object). It should be appreciated that, by taking advantage of the secondary index on "city," only a subset of objects in the bucket need to be retrieved, which could greatly improve efficiency and performance.

At node 505, the query executor 310 filters the stream of tuples using the predicate "age >25." At node 506, the query executor 310 performs a projection, narrowing the tuples from [ObjectID, all metadata] to [ObjectID, city, age, name]. At node 504, the query executor 310 sorts the stream by "name" in ascending ("ASC") order. Next, the query executor 310 performs processing associated with the root node 502. For example, if explicitly/default pagination parameters are given, the query executor 310 could apply pagination by skipping input tuples until the "marker" object id is found and limiting the output stream to "max-keys" tuples. The output of the root node 502 is referred to herein as the "result set stream."

The results formatter 312 prepares the result set stream into a suitable format for responding to the client. In some embodiments, the results formatter 312 generates a "list bucket response," which is a specified in the S3 API. For example, TABLE 8 shows portions of an illustrative XML-encoded list bucket response that could correspond to the query of TABLE 4. It will be appreciated that the response is the same as a standard list bucket response, but includes only a subset of objects in the bucket that satisfy the query. Thus, the client can specify the response format (XML in TABLE 4, although JSON, CSV, plain text, etc. could also be specified) using the Content-Type HTTP request header, can authenticate itself using standard user authentication headers, can control pagination using the "max-keys" and "marker" parameters, etc. For each object matching the query, the response includes an object id, the object data size, and a list of projected attributes. In some embodiments, the response could include a URL for each object, which a client can use to download object data.

TABLE 8

List Bucket Response Example

<ListBucketResult . . . >
  <Name>Employee</Name>
  <Prefix/>
  <Marker/>

TABLE 8-continued

List Bucket Response Example

```
  <MaxKeys>1000</MaxKeys>
  <IsTruncated>false</IsTruncated>
  <Contents>
     <ObjectID>Emp-6654-image.jpg</ObjectID>
     <city>Seattle</city>
     <age>26</age>
     <name>Alice</name>
  </Contents>
  <Contents>
     <ObjectID>Emp-2290-image.jpg</ObjectId>
     <city>Seattle</city>
     <age>29</age>
     <name>Bob</name>
  </Contents>
...
</ListBucketResult>
```

It will be appreciated that with query planning, secondary indexing, and other optimization techniques, object retrieval using the systems and techniques disclosed herein may be far more efficient than a simple list of all objects in a bucket and predicate evaluation against each object. Moreover, because the query language embodiments disclosed herein (i.e., "OSQL") are declarative, meaning that the client specifies what is to be queried but not how, the systems and techniques can be improved over time without change to clients.

Figure 6:
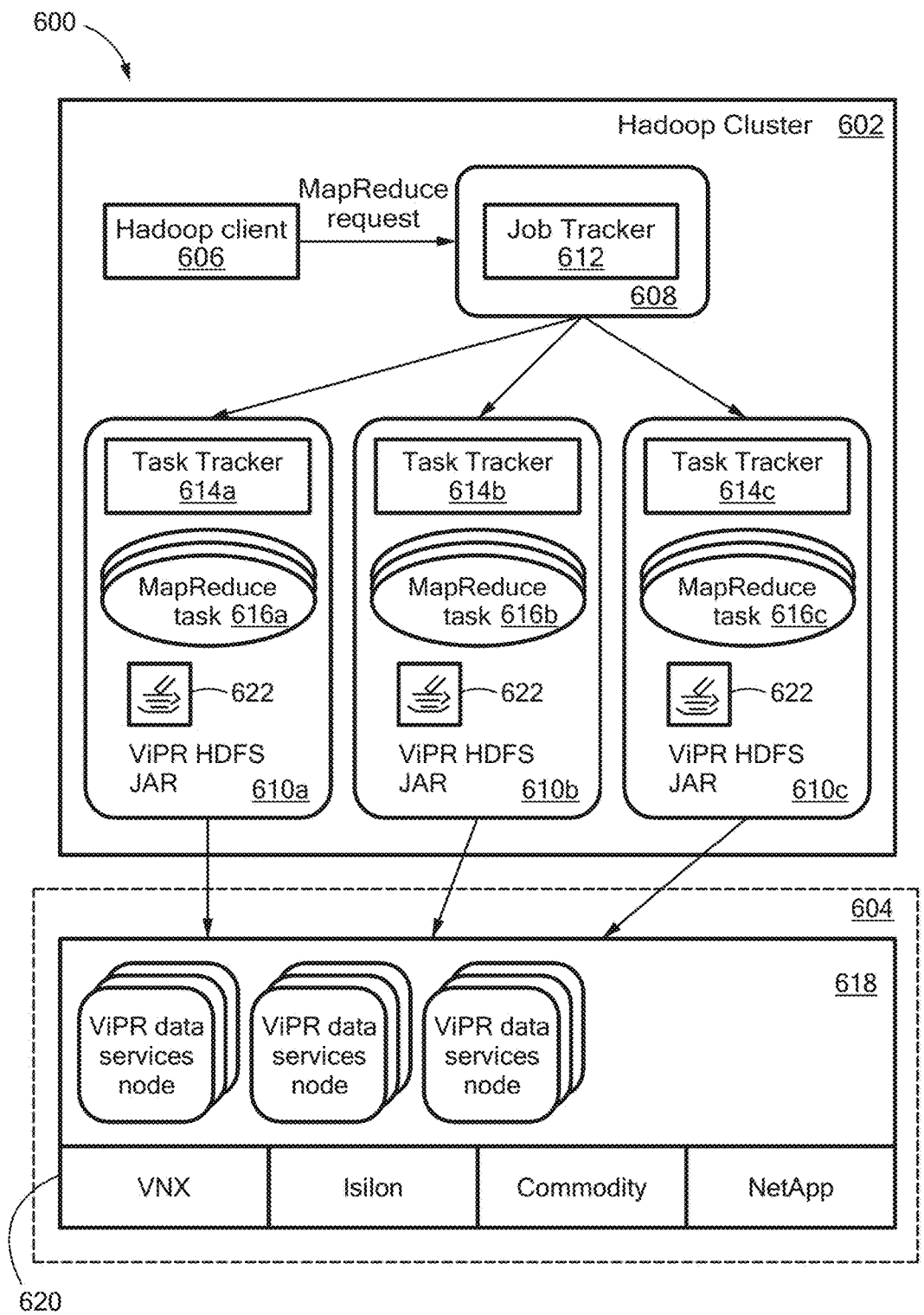
FIG. 6 is a diagram of an illustrative processing environment having a distributed processing system and a distributed object store.

Referring to FIG. 6, an illustrative processing environment 600 includes a distributed processing system 602 and a distributed object store 604, which may be the same as or similar to distributed object store 100 of FIG. 1. In this example, the distributed processing system 602 is shown to be a Hadoop cluster, although it will be appreciated that the concepts, structures, and techniques sought to be protected herein can be used with other distributed processing systems, including but not limited to Apache Spark clusters. For succinctness, distributed processing system 602 may be referred to herein as "cluster" 602.

A Hadoop cluster may provide both distributed processing capabilities and distributed data storage functionality. Distributed processing is typically provided by a MapReduce (MR) engine, which manages execution of MR jobs submitted by a job client (e.g., a user application). Hadoop MR is a software framework to facilitate developing applications that process vast amounts of data (e.g., multi-terabyte datasets) in parallel on large clusters (e.g., thousands of nodes) of commodity hardware in a reliable, fault-tolerant manner. An MR job splits an input dataset into independent partitions (sometimes referred to as "splits") which can be processed by so-called "map tasks" in a parallel manner. The MR framework sorts the outputs of the map tasks, which are then input to so-called "reduce tasks." The final output of the job is based on the output of the reduce tasks. The MR engine uses a JobTracker to manage execution of a job, and one or more TaskTrackers to manage execution of tasks. The MR framework handles scheduling tasks, monitoring tasks, and re-executing failed tasks.

A Hadoop cluster may utilize a distributed file system conforming to the Hadoop Compatible File System (HCFS) specification. The HCFS may be implemented within the cluster 602, or may external to the cluster. For example, a Hadoop cluster may include an HDFS NameNode to provide metadata functions, and one or more HDFS DataNodes to provide data I/O functionality. Typically, both a job's input and output are stored within a distributed file system. Intermediate results data (i.e., the output of individual map-reduce tasks) may be also be stored in a distributed file system. A single MR job can use multiple different file systems. For example, a job's input dataset could be read from an external HCFS, whereas the job's output data could be written to an HDFS instance local to the cluster 602.

A typical Hadoop cluster architecture includes a single master node and multiple worker nodes. The master node may act as a JobTracker, a TaskTracker, a NameNode, and a DataNode. The master node is responsible for scheduling a job's component tasks on the slaves, monitoring the tasks, and re-executing the failed tasks. The slaves execute the tasks as directed by the master. A slave or "worker node" may act as both a DataNode and TaskTracker, though it is possible to have data-only worker nodes and compute-only worker nodes.

A job client can submit new jobs to the JobTracker, specifying the location of the job's input dataset, the location where the job's output should be written, along with implementations of "map," "combine," and "reduce" functions. Such implementations may be provided as an executable, a Java Archive (JAR), or in any other suitable format.

The illustrative cluster 602 includes a job client 606, a master node 608, and one or more slave nodes 610, with three slave nodes 610a-610c shown in this example. The master node 608 may include a JobTracker 612 and a TaskTracker (not shown). A given one of the slave nodes 610a-610c may include a respective TaskTracker 614a-614c to execute respective MapReduce tasks 616a-616c. In some embodiments, each node 608, 610 may correspond to a separate physical and/or logical processing device.

The illustrative distributed object store 604 includes a plurality of data services nodes 618 and object storage 620, which may correspond to a storage array. The distributed object store 604 exposes object data and object metadata to the cluster 602 for distributed processing via an interface (e.g., HDFS interface 106a in FIG. 1). In the case of a Hadoop cluster 602, the distributed object store 604 appears as an HDFS "head" that allows buckets to appear as directories and object data and metadata to appear as files in the Hadoop File System format. In some embodiments, each data services node 618 acts as Hadoop Compatible File System (HCFS), implementing requisite NameNode and DataNode functionality. Thus, whereas a typical HDFS architecture includes one NameNode and multiple DataNodes, each node of the distributed object store 604 may act as both a NameNode and a DataNode such that all nodes are peers. Because any of the data nodes 618 data nodes are capable of accepting HDFS requests and servicing them, there is no single point of failure.

The cluster 602 may use the distributed object store 604 in various capacities. In some embodiments, the distributed object store 604 is an input data source for MR jobs and tasks. Here, the distributed object store 604 exposes object data or object metadata to the cluster 602 in a suitable format. For example, the distributed object store 604 may expose all object data in a given bucket as an HDFS directory having one file per object in the bucket. As another example, the distributed object store may expose all object metadata in a bucket as a single HDFS file containing multiple records.

In some embodiments, the cluster 602 also uses the distributed object store 604 to store intermediate task output and/or final job output. Alternatively, the cluster 602 may include a local HDFS cluster (i.e., a NameNode and one or more DataNodes) to store intermediate and/or final MR output.

It should be appreciated that the distributed object store 604 enable users to run Hadoop applications on top of various storage infrastructures 620, including EMC Isilon® and VNX®, and NetApp®, and commodity storage.

In certain embodiments, the cluster 602 uses a remote storage client 622 configurable to perform HDFS activity against a remote system, such as distributed object store 604. The remote storage client 622 may be provided as a set of Java classes (e.g., a JAR file) accessible by MR tasks 616. In some embodiments, the remote storage client 622 provides an implementation of a Hadoop FileSystem interface (i.e., org.apache.hadoop.fs.FileSystem for Hadoop 1 and/or org.apache.hadoop.fs.AbstractFileSystem for Hadoop 2), and thus may provide file and directory management (create, list, delete, set permissions, etc.), file read and write, and block location information.

Prior to running an MR job, the cluster 602 may be configured for operation with the distributed object store 604. For example, Hadoop stores system configuration information in a file named "core-site.xml," which resides on each node of a Hadoop cluster. Non-limiting examples of properties that may be added or modified in core-site.xml include: (1) remote storage client properties, such as properties to specify the location of the remote storage client 622 and/or configure the remote storage client 622; (2) file system location properties, such as properties define the file system URI (scheme and authority) to use when running Hadoop jobs, and IP addresses of the distributed object store data nodes 618 (or a load balancer in front of nodes 618); and (3) authentication and identification properties, such as properties to map user identities within the distributed object store 604 to user identities within the cluster 602.

Once the cluster 602 is configured to use the distributed object store 604 as a Hadoop file system, a user can define and execute Hadoop jobs (via the job client 606) that operate on object data and/or metadata within the distributed object store 604. Using Hadoop convention, the location of the job input dataset can be specified using a Uniform Resource Identifier (URI). In some embodiments, URI has the following format:

objectfs://bucket.tenant.installation.

In this illustrative format, "objectfs" is a fixed URI scheme value associated with the distributed object store 604. When the cluster 602 sees this particular scheme value, it activates the remote storage client 622 which, in turn, selects appropriate properties from the cluster configuration file (e.g., core-site.xml), connects to the distributed object store 604, and performs any other processing necessary to operate with the distributed object store 602. The "tenant" identifies a tenant (i.e., a namespace) within the distributed object store 604 and "bucket" identifies a bucket associated with the tenant. The identified bucket may contain object data and/or metadata to be analyzed by the cluster 602. The "installation_name" is a user-assigned name to specify a set of hosts (i.e., data service nodes 620 or a load balancer) to use for HDFS operations. For example, a user may define multiple different host lists within core-site.xml and select the desired host list on a per-job basis by changing the "installation_name" value.

In certain embodiments, a path can be included within the URI to specify the id of a single object within the bucket for which data or metadata should be returned, as shown in the following example:

objectfs://bucket.tenant.installation/path.

In some embodiments, a job specifies whether to operate on object data or whether to operate on object metadata based on the URI, as shown in the following example:

objectfs://bucket.tenant.installation?objectMetadata=true.

In this example, if the parameter "objectMetadata" is set to "true," the distributed object store will respond with object metadata; otherwise it will respond with object data. As with the example above, the "path" is optional.

In various embodiments, a simple predicate query can be specified on the URI, as shown in the following example:

objectfs://bucket.tenant.installation?q=age GT 25.

In the preceding example (for which URL-encoding is not shown for purposes of clarity), if the parameter "q" is defined, the corresponding value is treated as a simple predicate query. The response from the distributed object store will be limited to objects that satisfy the query. The distributed object store can efficiently process metadata queries using the secondary indexing techniques described above. Using this query facility, distributed processing can be limited to a subset of objects in a bucket.

For object data, the distributed object store 604 may expose a separate HDFS file for each object in a specified bucket (or the subset of objects in the bucket specified by a path or a metadata query). A conventional InputFormat (e.g., an InputFormat provided by the Hadoop framework) may be selected based on the type of object data being processed. For example, for text-based object data, a suitable text-based InputFormat can be selected. As another example, a binary InputFormat could be selected for processing image data. The InputFormat determines how data can be partitioned (or "split") for distributed processing by multiple MR tasks 216. For example, when the input is a file, the input format may produce a partition for each file block, which are typically between 128 MB to 1 GB in size.

For object metadata, the distributed object store 604 may provide all metadata for a specified bucket/path as a concatenated list of metadata for all objects in the specified bucket/path, referred to herein as a "metadata collection." In some embodiments, a metadata collection may correspond to a single HDFS file. It is appreciated herein that the MR programming model, which is used by Hadoop and other distributed processing frameworks, is designed to operate efficiently on very large files.

Figure 7:
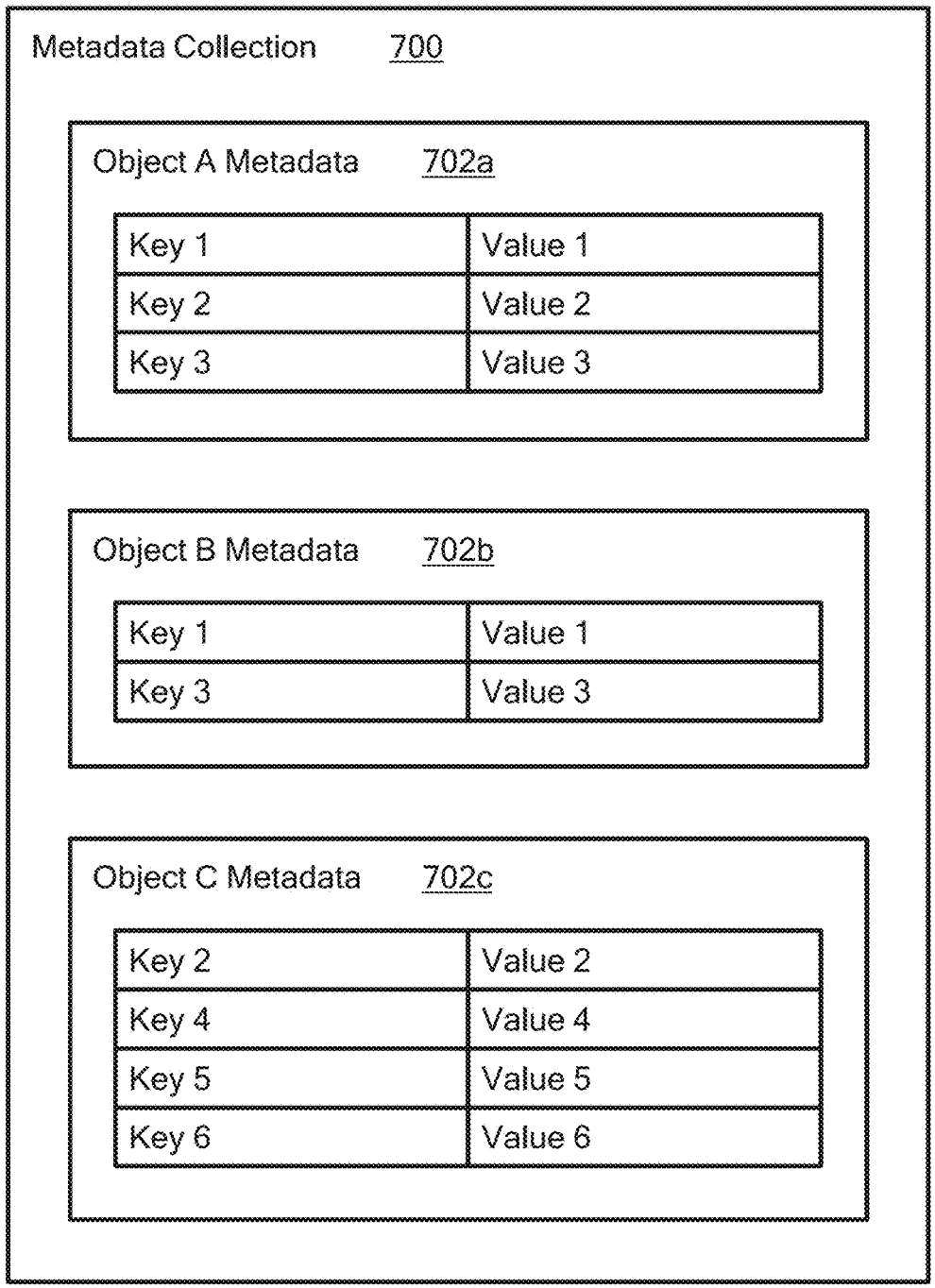
FIG. 7 is a block diagram of an illustrative metadata collection.

Referring to FIG. 7, a metadata collection 700 illustrates a format that may be used by a distributed object store 602 to expose object metadata to a distributed processing system (or "cluster") 604. The distributed object store 604 exposes metadata by treating metadata for a particular object as a single entity, referred to herein as a "metadata record," wherein each metadata record includes the object's metadata as key/value pairs, columnar data, or in any other suitable form. The illustrative metadata collection 700 includes three metadata records 702a-702c, which may correspond to metadata for all objects within a specified bucket, or a subset of such objects specified by a metadata query or path.

The general data format shown in FIG. 7 may be implemented using any suitable data formatting/serialization technique. A metadata record 700 may be formatted to be compatible with a particular type of cluster 602, and a single distributed object store 604 may be compatible with multiple different types of cluster 602. For example, if the cluster 602 is a Hadoop cluster, the distributed object store 604 may return metadata collection formatted using Apache Avro, Apache Thrift, Apache Parquet, Simple Key/Value, JSON, Hadoop SequenceFile, or Google Protocol Buffer. If the cluster 602 is based upon the Spark framework, the distributed object store 700 may return a metadata collection 700 formatted as a Resilient Distributed Dataset (RDD). In certain embodiments, a metadata formatting module 114

(FIG. 1) may include libraries or other processing to convert object metadata from an internal representation used within the distributed object store 100 to one any of the aforementioned data formats. In some embodiments, the metadata collection format returned by the distributed object store 604 is configurable (e.g., on a per-request or a per-installation basis), and an appropriate default format can be defined (e.g., Google Protocol Buffer or SequenceFile).

The cluster 602 may be configured to parse a metadata collection 700. In the case of a Hadoop cluster, a MR job uses an InputFormat implementation that can read an entire bucket's worth of object metadata from the distributed object store, and produce partitions (subsets of object metadata) for MR tasks to process. The MR job can determine how many tasks to execute across the cluster, and onto which nodes the tasks should be assigned. Ideally, an MR task and its assigned partition data are collocated. As used in this context, a "partition" refers to a unit of data that can be processed within the distributed processing system. In the case of Hadoop, each partition may be processed by a separate MR task. Because it is relatively expensive (in terms of time and/or processing resources) to initiate a MR task, preferably a single task should process many objects worth of metadata (i.e., performance may be improved by increasing partition size).

Figure 8:
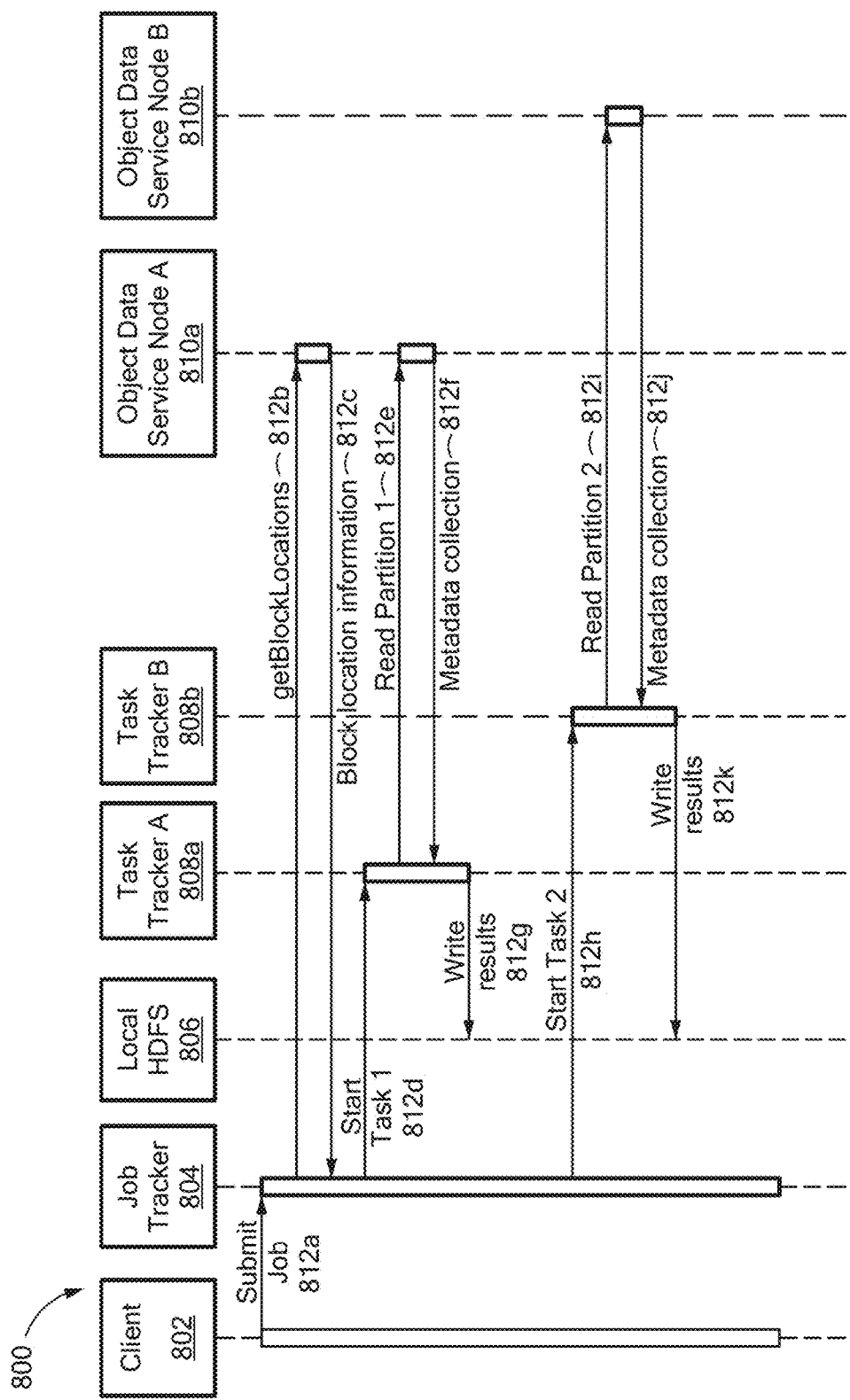
FIG. 8 is an interaction diagram showing interaction between a distributed processing system and a distributed object store.

FIG. 8 is an interaction diagram 800 showing interaction between a cluster 202 and a distributed object store 204. The diagram shows interaction between various processing units 802-810 over time, wherein interactions between processing units are shown by horizontal lines 812a-812k. The interactions may correspond to remote procedure calls, API operations, etc. In FIG. 4, the interactions between processing units is shown in an orderly, synchronous fashion. It should be understood that this is merely to promote clarity of understanding and that interactions can occur in parallel and/or in an asynchronous manner.

A given processing unit 802-810 may correspond to any physical and/or logical processing device. In some embodiments, one or more of the process units 802-810 correspond to nodes within the cluster 202 or distributed object store 204. In this example, the processing units include a job client 802, a JobTracker 804, local HDFS 806, Job Trackers 808a and 808b, and data service nodes 810a and 810b. The processing units 802-808 may correspond to portions of the cluster 202 and data service nodes 810a and 810b may correspond to nodes within the distributed object store 204.

At line 812a, the job client 802 submits a new job to the JobTracker 804. The job may be configured to analyze object metadata within a specified object store bucket. At line 812b, the JobTracker 804 requests information about the overall metadata "file" for bucket. Here, "file" corresponds to a metadata collection for a bucket (i.e., a concatenated list of metadata for all objects in the bucket) and may be specified using a URI as described above. If a metadata query has been specified for the job, the query may be encoded and included as a parameter to the URI. The request 812b can be made to an arbitrary a data service node 810 (810a in this example). At line 812c, data service node 810a responds with information about the bucket metadata file that the JobTracker 804 can use for planning purposes. In the case of Hadoop, request 812b may correspond to a getBlockLocations( ) call, and the response 812c may include block location information, including the number of blocks in the file, and which data service nodes 810 host which blocks. Using this information, the JobTracker 804 can produce partitions (or "splits") and assign the partitions to TaskTrackers 808 for distributed processing.

In this example, the JobTracker 804 determines that the bucket metadata file should be split into a first partition ("Partition 1") and a second partition ("Partition 2") to be processed by TaskTrackers 808a and 808b, respectively. Also in this example, the first and second partitions are assumed to be hosted by data service nodes 810a and 810b, respectively. In some embodiments, the JobTracker 804 attempts to collocate each task trackers 808a with its assigned partition data. Thus, TaskTracker 808a and data service node 810a may be collocated, and TaskTracker 808b and data service node 810b may be collocated.

At line 812d, the JobTracker 804 instructs TaskTracker 808a to commence processing the first partition. At line 812e, the TaskTracker 808a may proceed to read the first partition of metadata from data service node 810a. At line 812f, the data node 810a responds with a collection of metadata records corresponding to the first partition. The metadata is provided in a suitable format. It should be appreciated that data service node receiving the data request could, if necessary, retrieve data from a peer node (e.g., node 810a could retrieve data from node 810b). In some embodiments, the receiving data service node 810a performs one or more processing steps from the method 500 shown in FIG. 5 and described below in conjunction therewith.

The TaskTracker 808a proceeds to process the first partition. In the case of a Hadoop cluster, the TaskTracker 808a may apply a "map" function, a "combine" function, and/or a "reduce" function over the object metadata to generate intermediate/final output data. At line 812g, the output data may be stored in local HDFS 806.

The JobTracker 808b proceeds in a similar manner to read and process the second partition, as shown by lines 812h-812k. It should be understood that TaskTrackers 808a, 808b typically operate in parallel.

Figure 9:
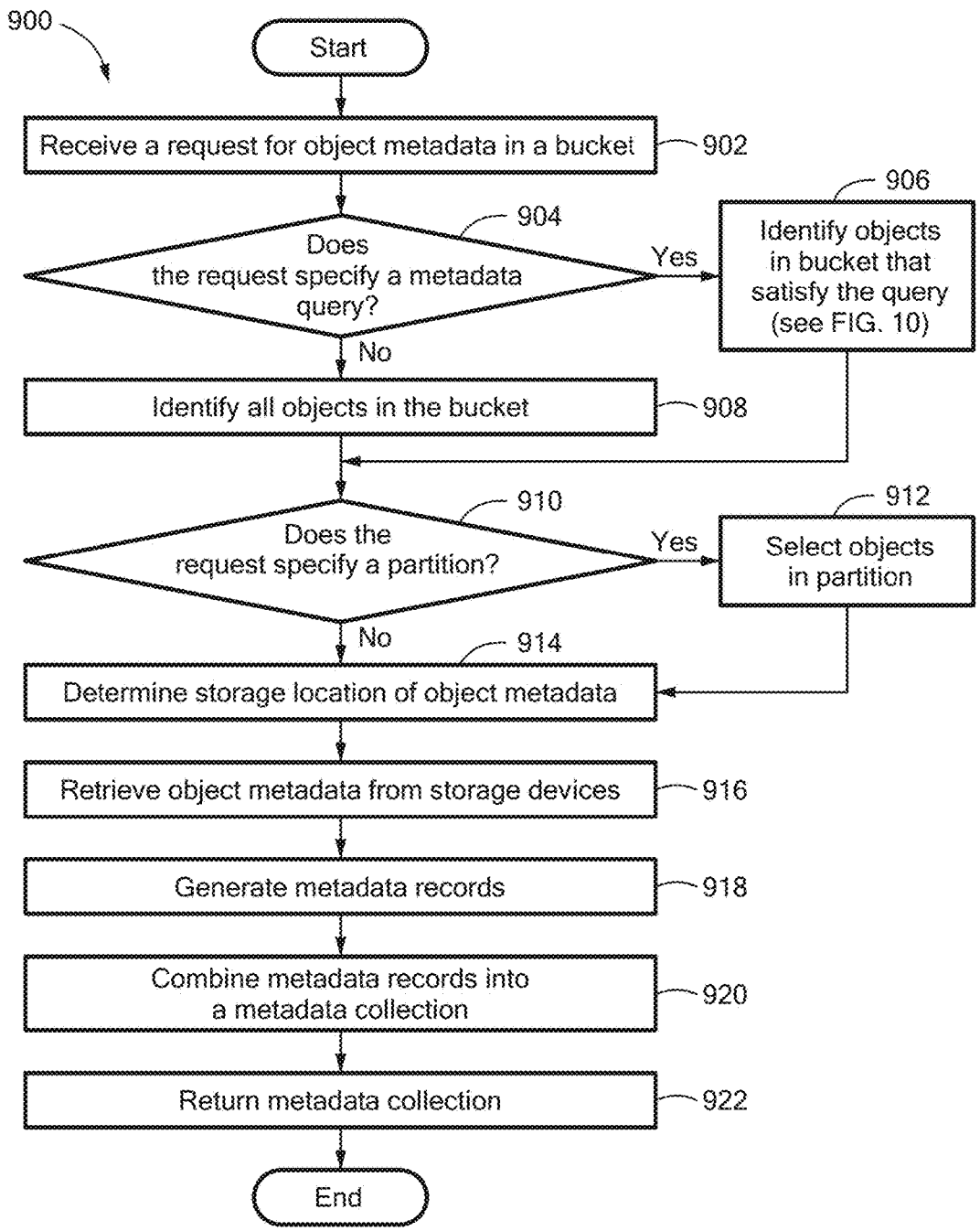
FIGS. 9 and 10 are flowcharts of illustrative methods for use within a distributed object store.
Figure 10:
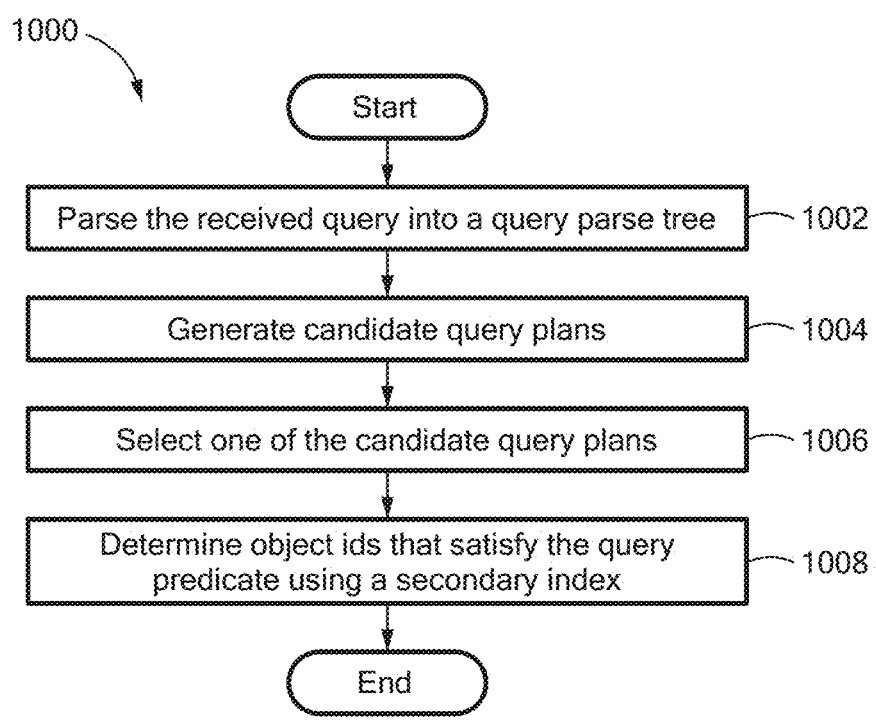

FIGS. 9 and 10 are flowcharts showing illustrative processing for use within a distributed object store (e.g., distributed object store 100 of FIG. 1). Rectangular elements (typified by element 902 in FIG. 9), herein denoted "processing blocks," represent computer software instructions or groups of instructions. Diamond shaped elements (typified by element 904 in FIG. 9), herein denoted "decision blocks," represent computer software instructions, or groups of instructions, which affect the execution of the computer software instructions represented by the processing blocks. Alternatively, the processing and decision blocks represent steps performed by functionally equivalent circuits such as a digital signal processor circuit or an application specific integrated circuit (ASIC).

The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 9, an illustrative method 900 begins at block 902 where a request for object metadata is received. In some embodiments, the request specifies a tenant id, a bucket id, and a partition.

If, at block 904, a metadata query is specified, the objects within the bucket that satisfy the query are identified (block 906). FIG. 10 shows an illustrative method that may correspond to the processing of block 904.

If, at block 904, a metadata query is not specified, all objects in the bucket are identified (block 908). This may include querying the primary index to determine the object id (and any other necessary information) of all objects in the given tenant id and bucket id. In some embodiments, this includes issuing a PREFIX-GET command to distributed key/value store 104 in FIG. 1, wherein the key includes the tenant id and the bucket id.

If, at block 910, a partition is specified, the list of objects (i.e., the objects identified at blocks 906 or 908) may be narrowed to include only objects in the specified partition (block 912).

At block 914, for each object in the list of identified/partitioned objects, the location of the object's metadata is determined. In some embodiments, object metadata location information is available within the primary index and, thus, this information may have already been determined at blocks 906 or 908.

At block 916, the object metadata is retrieved from the corresponding storage locations. This may correspond to retrieving some object metadata locally (e.g., from local storage devices) and/or retrieving object metadata from peer data service nodes, as described above in conjunction with FIGS. 1 and 9.

At block 918, a metadata record may be generated for each object, the metadata record comprising all metadata for the object. A metadata record may be generated in Apache Avro format, Apache Thrift format, Apache Parquet format, Simple Key/Value format, JSON format, Hadoop Sequence-File format, Google Protocol Buffer format, or in any other suitable format.

At block 920, the metadata records are combined to form a metadata collection. In some embodiments, the metadata collection comprises forming a Resilient Distributed Dataset (RDD). In various embodiments, the metadata record format and/or the metadata collection format is configurable. In some embodiments, these formats can be specified within the request (i.e., the request received at block 902). At block 922, the metadata collection is returned.

FIG. 10 shows an illustrative method 1000 for processing a metadata query. The method 1000 may correspond to processing performed at block 906 of FIG. 9. At block 1002, the metadata query is parsed into a query parse tree and, at block 1004, one or more candidate query plans are generated based upon the query parse tree. The candidate query plans may physical query plans derived from logical query plans. At block 1006, one of the candidate query plans is selected for execution (e.g., using a cost model). At block 1008, object ids that satisfy the query predicate are determined using a secondary index (e.g., secondary index table 314 in FIG. 3).

Figure 11:
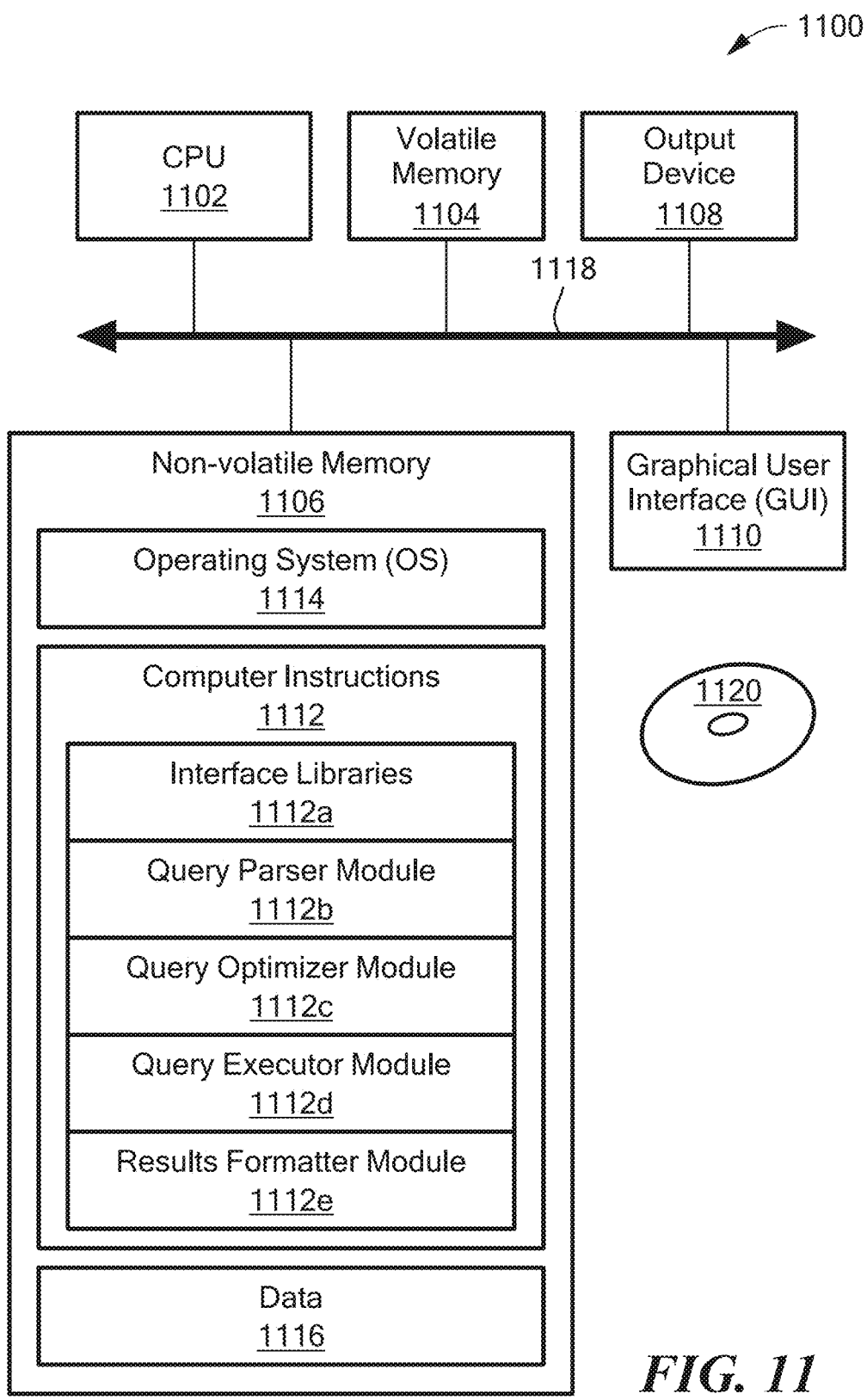
FIG. 11 is a schematic representation of an illustrative computer for use with a distributed object store.

FIG. 11 shows an illustrative computer or other processing device 1100 that can perform at least part of the processing described herein. The computer 1100 includes a processor 1102, a volatile memory 1104, a non-volatile memory 1106 (e.g., hard disk), an output device 1108 and a graphical user interface (GUI) 1110 (e.g., a mouse, a keyboard, a display, for example), each of which is coupled together by a bus 1118.

The non-volatile memory 1106 stores computer instructions 1112, an operating system 1114, and data 1116. In one example, the computer instructions 1112 are executed by the processor 1102 out of volatile memory 1104. In one embodiment, an article 1120 comprises non-transitory computer-readable instructions.

In certain embodiments, the computer instructions 1112 include one or more interface libraries 1112a (e.g., a REST-based API library and a HDFS interface library), query parser module instructions 1112b, query optimizer module instructions 1112c, query executor module instructions 1112d, and/or results formatter module instructions 1112e.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A computer-implemented method comprising:
providing one or more computer processors configured to perform:
providing access, from a distributed processing system, to a distributed object store configured for storing and retrieving object data and associated metadata, where the distributed object store uniquely identifies objects contained therein using an object key comprising one or more namespace identifiers and a unique object identifier (id) within the identified namespace, wherein the namespace identifiers comprise a tenant id uniquely identifying a tenant within the distributed object store, and a bucket id uniquely identifying a bucket that comprises a plurality of objects, the bucket defined by and belonging to the tenant, wherein the distributed object store is configured as part of a distributed key-value store, the distributed key-value store comprising:
a set of data and object metadata for the plurality of objects;
a primary index configured for storing a mapping of object ids to storage locations, for the plurality of objects; and
one or more secondary indexes each configured for storing information relating to properties of the plurality of objects different than the object ids and different than the set of data and metadata for the plurality of objects, wherein the one or more secondary indexes are each defined as part of a respective specified bucket, wherein each of the one or more secondary indexes comprises:
information based on the properties of the object metadata itself and information based on object access patterns for one or more applications that query the distributed object store;
a secondary index table maintaining a mapping between properties of the object metadata and cached object metadata properties for each stored object; and
a plurality of secondary index definitions, the secondary index definitions comprising information about one or more secondary indexes that have been created in the distributed key-value store, the information about the one or more secondary indexes comprising, for each respective secondary index, index name, indexed metadata keys, and cached metadata keys, the cached metadata keys corresponding to duplicates of one or more of the cached object metadata properties;
wherein providing duplicates of one or more of the cached object metadata properties is configured to improve data request performance by reducing time to access information about object metadata properties; and
wherein at least one of the one or more secondary indexes is configured to improve the efficiency of responding to data requests;
receiving a data request for object metadata from the distributed processing system, the data request associated with a first bucket within the distributed object store, wherein the first bucket comprises at least a first respective secondary index, the data request comprising an object metadata query,
identifying one or more objects within the first bucket that satisfy the object metadata query; wherein the object metadata query includes at least one query predicate involving an object metadata key, wherein identifying the one or more objects within the first bucket that satisfy the object metadata query comprises:
parsing the object metadata query into a query parse tree;
generating a plurality of candidate query plans, each of the candidate query plans being semantically equivalent to the object metadata query;
selecting one of the candidate query plans; and
identifying one or more objects that satisfy the query predicate by retrieving object ids from the first respective secondary index using a first bucket id associated with the first bucket and the object metadata key involved in the query predicate;
for each object identified as satisfying the object metadata query:
determining a location of corresponding object metadata stored within the distributed object store;
retrieving the corresponding object metadata using the determined location; and
generating a metadata record from the corresponding object metadata;
combining the metadata records from the identified objects into a metadata collection having a format compatible with the distributed processing system; and
returning the metadata collection to the distributed processing system in connection with the response to the data request.

2. The method of claim 1 wherein the data request further identifies a partition, wherein identifying one or more objects as objects associated with the first bucket comprises identifying one or more objects as objects associated with the first bucket and the partition.

3. The method of claim 1 wherein receiving the data request for object metadata from a distributed processing system comprises receiving a data request from a Hadoop cluster.

4. The method of claim 3 wherein receiving the data request for object metadata comprises receiving an Hadoop Distributed File System (HDFS) DataNode request.

5. The method of claim 3 further comprising receiving a Hadoop Distributed File System (HDFS) Namenda request from the distributed processing system, the HDFS NameNode request identifying a bucket within the distributed object store.

6. The method of claim 3 wherein generating the metadata record from the corresponding object metadata comprises generating a record in Apache Avro format, Apache Thrift format, Apache Parquet format, Simple Key/Value format, JSON format, Hadoop SequenceFile format, or Google Protocol Buffer format.

7. The method of claim 1 wherein receiving the data request for object metadata from a distributed processing system comprises receiving a data request from an Apache Spark cluster.

8. The method of claim 7 wherein combining the metadata records into the metadata collection comprises forming a Resilient Distributed Dataset (RDD).

9. The method of claim 1 where determining the location of corresponding object metadata stored within the distributed object store comprises using the distributed key/value store.

10. The method of claim 1 wherein identifying the one or more objects in the first bucket comprises issuing a PREFIX-GET command to the distributed key/value store, the PREFIX-GET command identifying a tenant and the bucket for the one or more objects.

11. The method of claim 1 wherein selecting one of candidate query plans comprises:
evaluating the candidate query plans based upon a cost model, the cost model based on usage of at least one of time and processing resources for the given candidate query plan; and
selecting one of candidate query plans based upon the cost model evaluation, wherein the selected candidate query plan has the lowest cost.

12. The method of claim 11 wherein generating candidate query plans includes:
generating at least one logical query plan according to the received query; and
generating a plurality of physical query plans according to the logical query plan, wherein the selected query plan corresponds to one of the plurality of physical query plans.

13. The method of claim 12 wherein generating a plurality of physical query plans comprises generating a tree representation, wherein nodes of the tree representation correspond to operations, the method further comprising traversing the nodes of the tree representation and executing the corresponding operations.

14. The method of claim 11 wherein evaluating the candidate query plans based upon a cost model comprises utilizing statistical information about the first respective secondary index computed from the distributed key-value store.

15. The method of claim 1 wherein retrieving object ids from the first respective secondary index comprises retrieving rows from the distributed key-value store using the bucket id associated with the query and the object metadata keys involved in the query predicate.

16. The method of claim 1, wherein configuring at least one or more secondary indexes to improve the efficiency of responding to data requests comprises at least one of:
configuring a secondary index to be responsive to one or more query predicates to reduce the number of objects retrieved in response to the data request; and
configuring at least one secondary index to organize entries within at least one secondary index table to improve efficiency of identifying entries that are responsive to a data request.

17. A system comprising:
one or more processors;
a distributed key/value store in operable communication with the one or more processors, the distributed key value store comprising:
a distributed object store configured for storing and retrieving object data and associated metadata, where the distributed object store uniquely identifies objects contained therein using an object key comprising one or more namespace identifiers and a unique object identifier (id) within the identified namespace, wherein the namespace identifiers comprise a tenant id uniquely identifying a tenant within the distributed object store, and a bucket id uniquely identifying a bucket that comprises a collection of objects, the bucket defined by and belonging to the tenant;
a set of data and object metadata for the plurality of objects;
a primary index configured for storing a mapping of object ids to storage locations, for the plurality of objects; and
one or more secondary indexes each configured for storing information relating to properties of the plurality of objects different than the object ids and different than the set of data and metadata for the plurality of objects, wherein the one or more secondary indexes are each defined as part of a respective specified bucket, wherein each of the one or more secondary indexes comprises:
information based on the properties of the object metadata itself and information based on object access patterns for one or more applications that query the distributed object store;
a secondary index table maintaining a mapping between properties of the object metadata and cached object metadata properties for each stored object; and
a plurality of secondary index definitions, the secondary index definitions comprising information about one or more secondary indexes that have been created in the distributed key-value store, the information about the one or more secondary indexes comprising, for each respective secondary index, index name, indexed metadata keys, and cached metadata keys, the cached metadata keys corresponding to duplicates of one or more of the cached object metadata properties;
wherein providing duplicates of one or more of the cached object metadata properties is configured to improve data request performance by reducing time to access information about object metadata properties; and
wherein at least one of the one or more secondary indexes is configured to improve the efficiency of responding to data requests;
a plurality of storage devices in operable communication with the one or more processors, the plurality of storage devices configured to store the object data and the object metadata; and
a plurality of data service nodes in operable communication with the one or more processors, each of the data service nodes coupled to the distributed key/value store and corresponding ones of the storage devices,
wherein a first one of the plurality of data service nodes comprises:
an object storage engine to determine the location of object metadata stored within the plurality of storage devices using the distributed key/value store;
a storage controller to retrieve the object metadata from the plurality of storage devices;
a metadata formatting module to generate metadata records from object metadata and to combine metadata records into a metadata collection having a format compatible with a distributed processing system; and
an interface configured to receive a data request for object metadata from the distributed processing system and, in cooperation with the controller, to return a metadata collection to the distributed processing system in response to the data request, wherein the data request is associated with a first bucket, wherein the first bucket comprises at least a first respective secondary index, the data request comprising an object metadata query that includes at least one predicate involving an object metadata key, wherein the controller is configured for identifying an object within the first bucket that satisfies the object metadata query by:
parsing the object metadata query into a query parse tree;
generating a plurality of candidate query plans, each of the candidate query plans being semantically equivalent to the object metadata query;
selecting one of the candidate query plans; and
identifying one or more objects that satisfy the query predicate by retrieving object ids from the first respective secondary index using a first bucket id associated with the first bucket and the object metadata key involved in the query predicate;
for each object identified as satisfying the object metadata query:
determining a location of corresponding object metadata stored within the distributed object store;
retrieving the corresponding object metadata using the determined location; and
generating a metadata record from the corresponding object metadata;
combining the metadata records from the identified objects into a metadata collection having a format compatible with the distributed processing system; and
returning the metadata collection to the distributed processing system in connection with the response to the data request.

18. The system of claim 17 wherein the distributed processing system comprises a Hadoop cluster.

19. The system of claim 18 wherein the metadata formatting module generates metadata records in Apache Avro format, Apache Thrift format, Apache Parquet format, Simple Key/Value format, JSON format, Hadoop SequenceFile format, or Google Protocol Buffer format.

20. The system of claim 17 wherein the distributed processing system comprises an Apache Spark cluster.

* * * * *